US012691430B2

(12) United States Patent
Kim et al.

(10) Patent No.: US 12,691,430 B2
(45) Date of Patent: Jul. 28, 2026

(54) MICROFLUIDIC REACTOR FOR CONTROLLING CHEMICAL REACTION AND CHEMICAL REACTION CONTROL METHOD USING THE SAME

(71) Applicants: POSTECH Research and Business Development Foundation, Pohang-si (KR); The University of Hong Kong, Hong Kong (HK)

(72) Inventors: Dong Pyo Kim, Pohang-si (KR); Gwang-Noh Ahn, Anyang-si (KR); Jiho Kang, Busan (KR); Ji Tae Kim, Hong kong (HK)

(73) Assignees: POSTECH RESEARCH AND BUSINESS DEVELOPMENT FOUNDATION, Pohang-si (KR); THE UNIVERSITY OF HONG KONG, Hong Kong (HK)

( * ) Notice: Subject to any disclaimer, the term of this patent is extended or adjusted under 35 U.S.C. 154(b) by 941 days.

(21) Appl. No.: 17/893,276

(22) Filed: Aug. 23, 2022

(65) Prior Publication Data

US 2023/0117674 A1 Apr. 20, 2023

(30) Foreign Application Priority Data

Oct. 12, 2021 (KR) ........................ 10-2021-0135362

(51) Int. Cl.
*B01J 19/00* (2006.01)
*B01L 3/00* (2006.01)

(52) U.S. Cl.
CPC ..... *B01J 19/0093* (2013.01); *B01L 3/502707* (2013.01); *B01J 2219/00783* (2013.01);
(Continued)

(58) Field of Classification Search
CPC .......... B01J 19/0093; B01J 2219/00783; B01J 2219/00788; B01J 2219/0079;
(Continued)

(56) References Cited

U.S. PATENT DOCUMENTS

2006/0171846 A1 8/2006 Marr et al.
2014/0038855 A1 * 2/2014 Bergh .................. B01J 19/0046 506/39
(Continued)

FOREIGN PATENT DOCUMENTS

BR 102019001325 A2 * 8/2020 ............. C07C 67/02
JP 2004-313867 11/2004
(Continued)

OTHER PUBLICATIONS

Cotta (BR-102019001325-A2) English translation (Year: 2025).*
(Continued)

*Primary Examiner* — Jennifer Wecker
*Assistant Examiner* — Jonathan Bortoli
(74) *Attorney, Agent, or Firm* — LEX IP MEISTER, PLLC

(57) ABSTRACT

The present invention relates to a microfluidic reactor for controlling a chemical reaction and a chemical reaction control method using the same, and more specifically provides a microfluidic reactor capable of controlling a chemical reaction on an expanded scale and a microfluidic reaction device including the same. In addition, the present invention provides an ultrafast synthesis method for controlling unstable intermediates using the microfluidic reactor and microfluidic reaction device.

9 Claims, 31 Drawing Sheets

(52) U.S. Cl.
CPC ................ *B01J 2219/00873* (2013.01); *B01J 2219/00889* (2013.01); *B01L 2300/0874* (2013.01)

(58) Field of Classification Search
CPC .... B01J 2219/00792; B01J 2219/00813; B01J 2219/00822; B01J 2219/00873; B01J 2219/00889; B01J 2219/00894; B01J 2219/00963; B01L 2300/0874; B01L 3/502707; Y02T 10/64; Y02T 10/72
See application file for complete search history.

(56) References Cited

U.S. PATENT DOCUMENTS

| | | | | |
|---|---|---|---|---|
| 2016/0346757 | A1* | 12/2016 | Rubio Martinez | C07F 5/06 |
| 2021/0046481 | A1* | 2/2021 | Frank | B01L 3/502715 |
| 2023/0285291 | A1* | 9/2023 | Campagna | C12Y 304/22069 |

FOREIGN PATENT DOCUMENTS

| | | |
|---|---|---|
| JP | 2007-136253 | 6/2007 |
| KR | 10-1937795 | 4/2019 |
| KR | 10-2021-0024085 | 3/2021 |

OTHER PUBLICATIONS

Zhang ("3D Printing of Metallic Microstructured Mould Using Selective Laser Melting for Injection Moulding of Plastic Microfluidic Devices"). Micromachines (Basel). Sep. 10, 2019;10(9):595. doi: 10.3390/mi10090595. PMID: 31510027; PMCID: PMC6780298. (Year: 2019).*

Aiichiro Nagaki et al., "Generation and reaction of cyano-substituted aryllithium compounds using microreactors", Org. Biomol. Chem., 2010, 8, 1212-1217, Jan. 13, 2010, DOI: 10.1039/b919325c.

Aiichiro Nagaki et al., "Nitro-Substituted Aryl Lithium Compounds in Microreactor Synthesis: Switch between Kinetic and Thermodynamic Control", Angew. Chem. Int. Ed. 2009, 48, 8063 -8065, DOI: 10.1002/anie.200904316.

Hyune-Jea Lee et al., "Enhanced Controllability of Fries Rearrangements Using High-Resolution 3D-Printed Metal Microreactor with Circular Channel", Small, vol. 15, Issue 50, Dec. 13, 2019, 1905005, DOI: 10.1002/smll.201905005.

Heejin Kim et al., "Integrated One-Flow Synthesis of Heterocyclic Thioquinazolinones through Serial Microreactions with Two Organolithium Intermediates", Angew. Chem. Int. Ed. 2014, 53, 1-5, DOI: 10.1002/anie.201410062.

Heejin Kim et al., "Submillisecond organic synthesis: Outpacing Fries rearrangement through microfluidic rapid mixing", Science, vol. 352, Issue 6286, May 6, 2016.

Yuanhai Su, et al., "A convenient numbering-up strategy for the scale-up of gas-liquid photoredoxflow", React. Chem. Eng., 2016,1, 73-81, DOI: 10.1039/c5re00021a.

KIPO, Office Action of KR 10-2021-0135362 dated Apr. 3, 2023.

Hyune-Jea Lee, "Ultrafast Synthetic Chemistry via Time Controlled Short-Lived Lithiated Intermediates in Metal Microreaction Systems", Department of Chemical Engineering, Pohang University of Science and Technology, 2019, Doctoral Thesis.

* cited by examiner

Bottom plate of external flow distributor

Top plate of external flow distributor

| Total flow rate [mL min$^{-1}$] | Pressure drop [Pa] | |
|---|---|---|
| | 4N-PMR | 16N-PMR |
| 10.5 | 1521 | - |
| 21 | 5624 | - |
| 42 | 14400 | 5213 |
| 84 | 65940 | 17663 |
| 126 | 143300 | - |
| 168 | 269800 | 45675 |
| 420 | 1536000 | - |
| 336 | - | 207522 |
| 504 | - | 453404 |
| 672 | - | 851796 |
| 1344 | - | 4851276 |

| Mixing time (ms) | SMR | Modified SMR |
| --- | --- | --- |
| 1 |  $\eta = 0.99$ |  $\eta = 0.73$ |
| 2 |  $\eta = 0.99$ |  $\eta = 0.88$ |
| 3 |  $\eta = 0.99$ |  $\eta = 0.95$ |
| 4 |  $\eta = 0.99$ |  $\eta = 0.98$ |
| 5 |  $\eta = 0.99$ |  $\eta = 0.99$ |
| 16 |  $\eta = 0.99$ |  $\eta = 0.99$ |

1
2

1a (Optimum: 25 °C)
2a, 93% (92%)*
2b [a], 86% (85%)*
2c, 95% (98%)*
2d, 88% (91%)*

1b (Optimum: 0 °C)
2e, 87% (85%)*
2f, 90% (89%)*
2g, 93% (90%)*
2h [b) c)], 98% (97%)*

1c (Optimum: - 28 °C)
2i, 87% (88%)*
2j [d)], 86% (84%)*
2k [d)], 97% (99%)*
2l, 86% (89%)*

| Entry | Flow rate of **1a** [mL min⁻¹] | Flow rate of *n*-BuLi [mL min⁻¹] | $t^{R1}$ [s] | Equivalent of *n*-BuLi | Yield of **2a** [%] | Yield of **3a** [%] |
|---|---|---|---|---|---|---|
| 1 | 6.0 | 1.50 | 6.28 | 1.05 | 56 | 0 |
| 2 | 6.0 | 1.50 | 1.88 | 1.05 | 65 | 0 |
| 3 | 6.0 | 1.50 | 0.25 | 1.05 | 74 | 0 |
| 4 | 6.0 | 1.50 | 0.016 | 1.05 | 93 | 0 |
| 5 | 5.9 | 1.47 | 0.016 | 1.05 | 90 | 0 |
| 6 | 5.9 | 1.53 | 0.016 | 1.09 | 86 | 5 |
| 7 | 6.1 | 1.47 | 0.016 | 1.01 | 90 | 0 |
| 8 | 6.1 | 1.53 | 0.016 | 1.05 | 93 | 0 |

1b, 1c 2h, 2l

| Entry | Aryl halide | T [°C] | $t^{R2}$ [s] | Product | Yield [%] |
| --- | --- | --- | --- | --- | --- |
| 1 | | | 0.56 | | 98 |
| 2 | 1b | 0 | 1.12 |  | 61 |
| 3 | | | 2.24 | 2h[a)] | 54 |
| 4 | | | 2.24 | | 86 |
| 5 | 1c | -28 | 4.49 |  | 63 |
| 6 | | | 8.98 | 2l[b)] | 55 |

1 2b 2h 2j

| Microreactor | Yield of **2b** [%][a)] | Output of **2b** [mg min$^{-1}$] | Yield of **2h** [%][b)] | Output of **2h** [mg min$^{-1}$] | Yield of **2j** [%][c)] | Output of **2j** [mg min$^{-1}$] |
|---|---|---|---|---|---|---|
| **SMR** | 86 | 131.2 | 98 | 137.7 | 86 | 70.8 |
| **4N-PMR** | 85 | 518.8 | 97 | 545.3 | 84 | 276.5 |
| **16N-PMR** | 81 | 1971.0 | 92 | 2068.9 | 80 | 1053.2 |

1
0.10 M in THF

RLi
0.42 M in hexane

Electrophile
0.60 M in THF

2b

2h

2j

MICROFLUIDIC REACTOR FOR CONTROLLING CHEMICAL REACTION AND CHEMICAL REACTION CONTROL METHOD USING THE SAME

CROSS-REFERENCE TO RELATED APPLICATION

This application claims priority to and the benefit of Korean Patent Application No. 10-2021-0135362, filed on Oct. 12, 2021, the disclosure of which is incorporated herein by reference in its entirety.

TECHNICAL FIELD

The present invention relates to a microfluidic reactor for controlling a chemical reaction and a chemical reaction control method using the same, and more specifically provides a microfluidic reactor capable of controlling a chemical reaction on an expanded scale and a microfluidic reaction device including the same. In addition, the present invention provides an ultrafast synthesis method for controlling unstable intermediates using the microfluidic reactor and microfluidic reaction device.

BACKGROUND ART

Microfluidic reactors have been used to enhance the efficiency of various chemical reactions based on fast mass and heat transfer due to the high volume-to-surface area ratio. In particular, microfluidic reactors have received great attention in the field of organic chemistry for their ability for ultrafast synthesis utilizing highly reactive, short-lived organolithium intermediates through precise residence time control. The treatment of labile intermediates produced by the lithium-halogen exchange reaction provides a direct and efficient synthesis route for the target compound and achieves higher productivity from the enhanced selectivity and yield of the target compound beyond the batch reactor. In addition, the unavoidable high flow rate for short residence time and high mixing efficiency also contributes to high productivity. Therefore, ultrafast synthesis may be relatively free from the inherent productivity constraints of existing microfluidic reactors.

In 2016, the inventors of the present invention developed a highly chemical-resistant and pressure-resistant chip microreactor (CMR) with precise rectangular cross-sectional channels (250 μm×125 μm) to realize residence times of less than milliseconds through the lamination of polyimide (PI) films. By controlling the Fries rearrangement, the target compound was selectively obtained with a yield of 73% and a productivity of 49.6 mg $min^{-1}$ (H. Kim, K. I. Min, K. Inoue, D. J. Im, D. P. Kim, J. 1. Yoshida, *Science* 2016, 352, 691-694).

In 2019, the inventors of the present invention newly developed a 3D printed stainless steel metal microfluidic reactor with precise circular channels (Ø=170 μm) to enhance mixing efficiency by using the high-resolution 3D selective laser melting (SML) printing which is capable of fabricating precise micrometer scale structures. Through the enhanced controllability of the intermediates in the rearrangement reaction, the reaction yield and productivity were increased to 85% and 57.8 mg $min^{-1}$, respectively (H. J. Lee, R. C. Roberts, D. J. Im, S. J. Yim, H. Kim, J. T. Kim, D. P. Kim, *Small* 2019, 15, 3-7). Therefore, the productivity enhancement of ultrafast synthesis was achieved from the acquisition of selectivity and yield. However, since the limitations of productivity due to the small scale of the microfluidic reactor itself still remain, it is necessary to use a larger capacity microfluidic reactor for industrial level productivity (Y. Su, K. Kuijpers, V. Hessel, T. Noël, *React. Chem. Eng.* 2016, 1, 73-81).

A general scale-up method for increasing the capacity of a single reactor involves re-optimization of reaction conditions. In particular, when the length of the microfluidic reactor is increased while maintaining the diameter, which affects the mixing efficiency for the same residence time, the pressure drop inside the microfluidic reactor increases exponentially according to the square of the length increase rate. Therefore, in order to improve productivity without increasing the pressure drop, the numbering-up strategy of the microfluidic reactor is required. In the case of the numbering-up microfluidic reactor, the adoption of a flow rate distributor structure is essential in order to uniformly distribute the flow rate to each microfluidic reactor. Since the reaction channel portion for ultrafast synthesis is much smaller than other numbering-up microfluidic reactors for general organic synthesis, a subtle pressure difference in the distributor portion is expected to cause non-negligible flow imbalance. As a result, an uncontrolled intermediate will be rapidly decomposed. Therefore, for the scale-up of ultrafast synthesis, a sophisticated flow distributor and a reactor structure need to be combined to be manufactured as a single body, which is significantly difficult in engineering.

As related prior art, Japanese Patent Application Laid-Open No. 2007-136253 discloses a numbering-up microfluidic reactor system implemented by arranging a plurality of microfluidic reactors in parallel, but since a flow rate distributor and a plurality of microfluidic reactors are not integrally manufactured, there is a space limitation in scale expansion, and there is a problem in that it is difficult to provide uniform fluid distribution capability and precise residence time control capability only with the disclosed system.

In U.S. Patent Application Publication No. 2006/0171846, a microfluidic reaction device having an internal channel or chamber having a millimeter to sub-millimeter size for performing mixing and chemical reaction is disclosed, but it does not disclose a numbering-up microfluidic reaction device at an industrial production scale including a flow rate distributor and a plurality of reactors.

In Korean Patent Application Laid-Open No. 10-2021-0024085, a microfluidic reactor made of a ceramic material and manufactured by photocuring 3D printing technology and having excellent chemical resistance and corrosion resistance is disclosed, but likewise, since a flow rate distributor and a plurality of microfluidic reactors are not integrally manufactured, there is a space limitation in scale expansion.

In U.S. Patent Application Publication No. 2017/0151537, a microfluidic reaction system suitable for fluid contact is disclosed, but since a plurality of flow paths in a microfluidic reactor exist in an integrated form, there is no disclosure of providing uniform fluid distribution capability and precise residence time control capability.

In addition, since the disclosed devices are not commonly presented for ultrafast synthesis requiring subsecond residence time control, there is still a demand for the development of a microfluidic reactor as a single body in which a sophisticated flow distributor and a reactor structure are combined for the scale-up of ultrafast synthesis.

DISCLOSURE

Technical Problem

Under these circumstances, the inventors of the present invention have attempted to propose a new scale-up strategy of controlling a chemical reaction by using a metal numbering-up microfluidic reactor in order to avoid problems of reduced mixing efficiency or increased pressure drop. To this end, the inventors of the present invention have completed the present invention by designing a structure in which 4 single reactors and 4 flow distributors are integrated into a small integrated structure, fabricating 4 numbering-up printed metal microreactors (4N-PMR) implemented by the high-resolution SLM method, and demonstrating applicability in the pharmaceutical industry.

Accordingly, an object of the present invention is to provide a microfluidic reactor that can be scaled up and secure mixing efficiency.

In addition, another object of the present invention is to provide a microfluidic reactor that can easily implement a precise flow path structure.

In addition, still another object of the present invention is to provide a microfluidic reactor device that can variously scale up a plurality of microfluidic reactors according to design.

In another aspect, the present invention provides an ultrafast synthesis method for controlling an unstable intermediate in the above-described microfluidic reactor or microfluidic reaction device.

Technical Solution

In order to achieve the aforementioned objects, according to an aspect of the present invention, provided is a microfluidic reactor which is capable of controlling a chemical reaction between a plurality of fluids, including a housing formed of a metal material and having a predetermined volume; a unit flow path module formed inside the housing and including a plurality of unit flow paths having N inlets and a single outlet such that N fluids are respectively introduced and mixed and then discharged; a branch flow path module formed inside the housing and including N branch flow paths which are all connected to individual inlets provided in each of the plurality of unit flow paths to uniformly branch a fluid introduced into the housing into the plurality of unit flow paths; and a collection flow path formed inside the housing and collecting a mixed fluid moved from individual outlets provided in each of the plurality of unit flow paths and discharging to the outside of the housing, wherein the unit flow path module, the branch flow path module and the collection flow path are integrally formed in the process of stacking the housing through a 3D printing process.

In this case, the unit flow path module may have four unit flow paths including a first unit flow path to a fourth unit flow path, and each of the N branch flow paths constituting the branch flow path module and collection flow paths may be formed in a four-pronged branching structure.

In this case, the housing may be formed in a hexahedral shape including an upper surface, a lower surface and four side surfaces, wherein the plurality of unit flow paths may be arranged in parallel along the height direction of the housing, wherein the branch flow path module may include three branch flow paths, wherein the three branch flow paths are each disposed adjacent to any three side surfaces of the four side surfaces, and wherein the collection flow path may be disposed adjacent to one remaining side surface of the four side surfaces excluding the three side surfaces.

In this case, the plurality of unit flow paths may be connected in parallel so as to maintain the same flow rate.

In this case, the 3D printing process may be performed by selective laser melting.

In this case, the unit flow path may include a first inlet to a third inlet, and the two types of fluids introduced from the first inlet and the second inlet may be mixed to generate a first mixed fluid, and then further mixed with a fluid introduced from the third inlet.

In this case, each of the unit flow paths may be formed to have a circular vertical cross-section as a whole, wherein the diameter of the circular vertical cross-section may be about 500 μm, and wherein after the first mixed fluid is mixed, the distance that the first mixed fluid moves until it is mixed with the fluid introduced from the third inlet may be about 10 mm, and the moving time may be within 16 ms at most.

In this case, the microfluidic reactor may further include a metal frame formed of a metal material and formed to surround the outer surface of the housing, wherein the metal frame may be provided with N+1 coupling holes such that N+1 tube fixing members are screwed to be in close contact with the outer surface of the housing.

Meanwhile, according to another aspect of the present invention, provided is a microfluidic reaction device which is capable of controlling a chemical reaction, including a plurality of microfluidic reactors having the same structure as the above-described microfluidic reactor; N external distributors which are all connected to the inlet ends of the branch flow paths provided in each of the plurality of microfluidic reactors so as to uniformly branch with respect to the plurality of microfluidic reactors after receiving a fluid from the outside; and an external collector which is connected to all of the outlet ends of the collection flow paths provided in each of the plurality of microfluidic reactors so as to collect the mixed fluids produced from the plurality of microfluidic reactors.

In this case, the microfluidic reaction device may include 4 microfluidic reactors so as to have 16 unit flow paths in total.

According to still another aspect of the present invention, provided is a method for controlling a chemical reaction in the above-described microfluidic reactor or microfluidic reaction device.

The chemical reaction may be an ultrafast chemical reaction.

The ultrafast chemical reaction may control a highly reactive intermediate.

The highly reactive intermediate may exhibit a residence time of less than milliseconds.

The ultrafast chemical reaction may be an ultrafast synthesis reaction using an aryllithium intermediate and an electrophile.

The ultrafast synthesis reaction may obtain any one of Compound 2a to Compound 2d below using Compound 1a below as a starting material:

[Compound 1a]

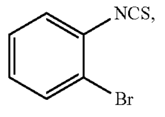

-continued

[Compound 2a]

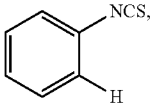

[Compound 2b]

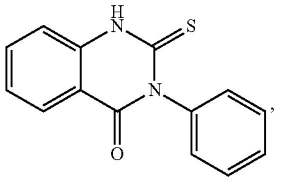

[Compound 2c]

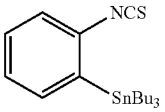

and

[Compound 2d]

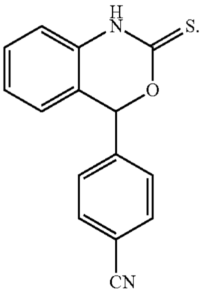

Alternatively, the ultrafast synthesis reaction may obtain any one of Compound 2e to Compound 2 h below using Compound 1b below as a starting material:

[Compound 1b]

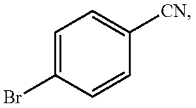

[Compound 2e]

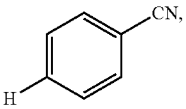

[Compound 2f]

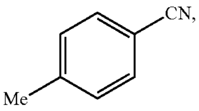

[Compound 2g]

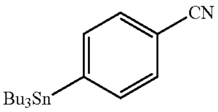

and

[Compound 2h]

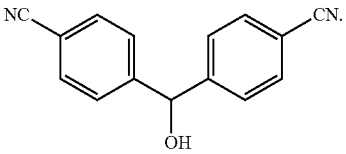

Alternatively, the ultrafast synthesis reaction may obtain any one of Compound 2i to Compound 2l below using Compound 1c below as a starting material:

[Compound 1c]

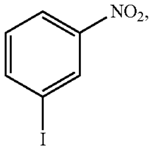

[Compound 2i]

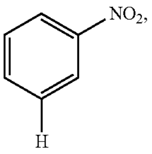

[Compound 2j]

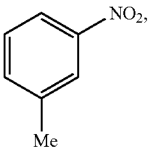

[Compound 2k]

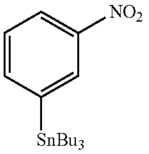

and

[Compound 2l]

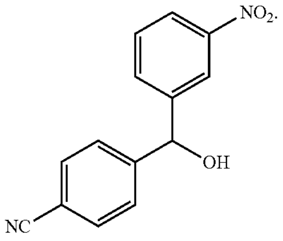

Advantageous Effects

As the microfluidic reactor according to an exemplary embodiment of the present invention is manufactured through a 3D printing process, a flow path structure having an integrated structure may be very precisely formed, and accordingly, a plurality of unit flow paths may be connected in parallel to each other so as to have uniform flow characteristics, thereby easily expanding the capacity of the microfluidic reactor capable of controlling a chemical reaction.

The microfluidic reactor according to an exemplary embodiment of the present invention includes a plurality of microfluidic reactors having a compact size and shape, and the plurality of microfluidic reactors may be connected in parallel through an external distributor and an external collector, thereby more efficiently expanding the capacity of the microfluidic reactor as necessary.

The ultrafast synthesis method using the microfluidic reactor or the microfluidic reaction device according to an exemplary embodiment of the present invention controls a highly reactive intermediate at various optimal temperatures to maintain a yield at a level similar to that of a single microfluidic reactor, and exhibits productivity that is increased by 4 to 16 times compared to that of a single microfluidic reactor. Accordingly, it is possible to produce pharmaceutical scaffolds in a gram scale.

DESCRIPTION OF DRAWINGS

FIGS. 1A and 1B show the design concept and fabrication of four numbering-up printed microfluidic reactors (4N-PMR) with stainless steel metal, wherein FIG. 1A shows the geometric modification of a single microfluidic reactor (SMR) that maintains the residence time and high mixing efficiency, wherein in FIG. 1B, a shows the plan for the unitary design of 4 microfluidic reactor arrays for the 4N-PMR modules, and b shows the CFD simulation of the pressure gradient and mixing efficiency in the 4N-PMR with the circular cross-section of the microchannels. c-1 is the captured 2D scan image, and c-2 is the 3D visualization image obtained from the X-ray image data of the 4N-PMR fabricated with the high-resolution 3D selective laser melt printing technology.

FIGS. 4A and 4B show the comparative simulation of the pressure drop according to the SMR and the modified SMR, wherein FIG. 4A shows the SMR, and FIG. 4B shows the modified SMR.

FIGS. 5A and 5B show the computational fluid dynamics (CFD) simulation of the 4N-PMR and the virtual series microfluidic reactor with the same productivity expected, wherein FIG. 5A shows the outline of the pressure drop according to the 4N-PMR, and FIG. 5B shows the outline of the pressure drop according to the series microfluidic reactor. The maximum pressure in the series microfluidic reactor is expected to be 6.24 times that of the 4N-PMR.

FIGS. 8A and 8B show the design concept and fabrication of the 16 numbering-up printed microfluidic reactor (16N-PMR) assembly, wherein FIG. 8A shows the manner of stacking 4 modules of the 4N-PMR by connecting 4 external flow distributor (EFD) units (left: side view, right: top view), and FIG. 8B shows the actual 16N-PMR system which is composed of 4×4N-PMR modules and 3 EFDs as the inlets and 1 EFD as the collection outlet.

FIGS. 9A, 9B and 9C are a conceptual diagram of the stainless steel (S/S) external flow distributor (EFD) manufactured by computerized numerical control (CNC) processing, wherein FIGS. 9A and 9B represent the cross-sectional layout and detailed dimensions of the bottom plate and the top plate, respectively, and FIG. 9C is an image showing the rigid coupling of the top and bottom plates connected by tubing and fitting.

FIG. 10A: THF at 96 mL $min^{-1}$, FIG. 10B: THF at 48 mL $min^{-1}$, FIG. 10C: hexane or $Et_2O$ at 24 mL $min^{-1}$. Gravity acts in the negative direction of the y-axis.

FIGS. 12A and 12B show a computational fluid dynamics (CFD) simulation for determining the internal flow distribution behavior of a modular 16N-PMR assembly, wherein FIG. 12A represents the fluid conditions of the solvent used to calculate the numerical flow distribution at a specific position between the end of the EFD and the inlet of the 4N-PMR (indicated by the same color with the same symbols (○, Δ, □, ◇)), and FIG. 12B represents the calculated MF values collected at 3 EFDs and outlets (total of 168 mL $min^{-1}$).

FIGS. 16A, 16B and 16C show an experimental setup of the scalable subsecond synthesis of drug scaffolds through an aryllithium intermediate using a 16N-PMR assembly, wherein FIG. 16A is an actual image of the overall setup, FIG. 16B is the 16N-PMR in an acetone bath for the ultrafast reaction of m-lithionitrobenzene at −28° C., and FIG. 16C is the 16N-PMR in an ice bath for the ultrafast reaction of p-lithiobenzonitrile at 0° C.

MODES OF THE INVENTION

Figure 1A:
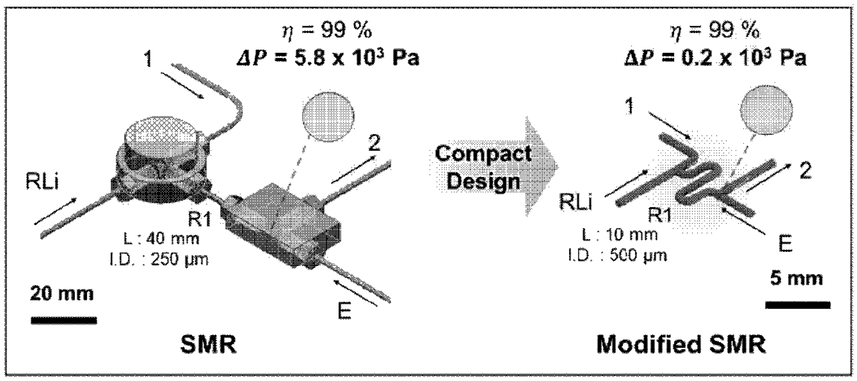

Hereinafter, with reference to the accompanying drawings, exemplary embodiments of the present invention will be described in detail so that those of ordinary skill in the art can easily practice the present invention. The present invention may be embodied in many different forms and is not limited to the exemplary embodiments described herein. In order to clearly describe the present invention in the drawings, parts that are irrelevant to the description are omitted, and the same reference numerals are assigned to the same or similar elements throughout the specification. In addition, the size or shape of the components shown in the drawings may be exaggerated for the clarity and convenience of description.

The microfluidic reactor 100 according to an exemplary embodiment of the present invention is a device for mixing a plurality of types of fluids with each other in order to achieve a desired chemical reaction, and then collectively collecting the generated mixed fluid.

In this case, the microfluidic reactor 100 according to an exemplary embodiment of the present invention is capable of minimizing the residence time of the mixed fluid such that ultrafast synthesis, which was not possible in a conventional batch reactor, is possible, and a plurality of unit flow paths to be described below are included, and thus, it is possible to stably achieve scale-up for maximizing productivity.

To this end, the microfluidic reactor 100 according to an exemplary embodiment of the present invention may include a housing 110 and a unit flow path module 130, a branch flow path module 150 and a collection flow path 170 formed inside the housing 110.

Figure 1B:
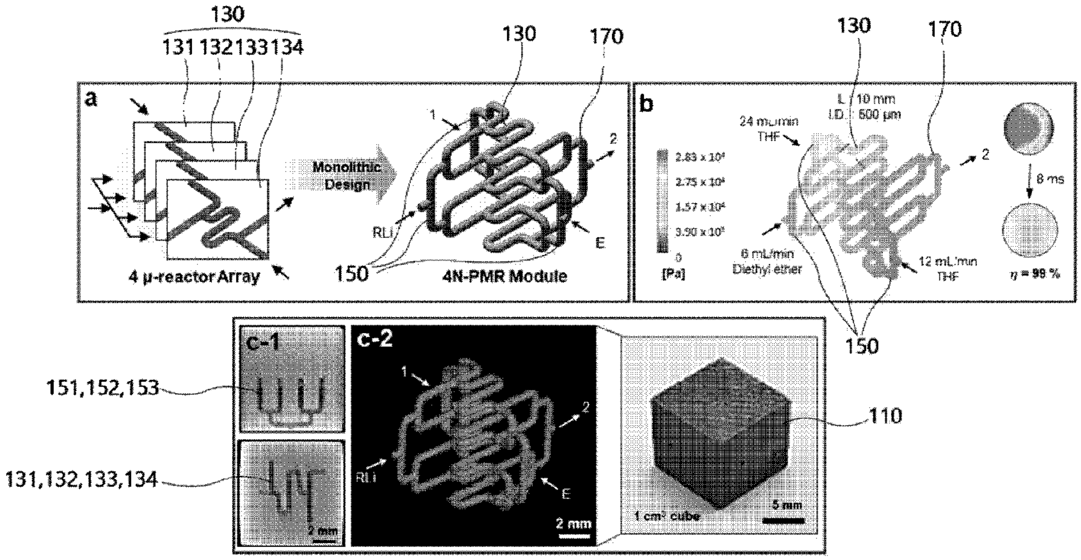

In this case, the housing 110 may have a predetermined volume as shown in FIG. 1B such that the unit flow path module 130, the branch flow path module 150 and the collection flow path 170 may be sufficiently disposed therein. In addition, the housing 110 may be formed of an appropriate metal material to minimize durability deterioration due to chemical corrosion or physical corrosion caused by a fluid.

As a specific example, the housing 110 may be formed through a 3D printing process. That is, the housing 110 may be formed through a process of laminating metal powder by melting with a heat source such as a laser.

In this case, the housing 110 may be manufactured by selective laser melting (SLM) among well-known 3D printing processes, that is, a method in which metal powder made of particle particles of about 10 to 60 m is coated in a thin layer, fiber laser is irradiated to a region to be molded to melt the metal powder, and the metal powder is continuously stacked for each layer. As such, when it is manufactured by SLM, 3D printing having ultra-high resolution is possible, and since the housing 110 at a very precise level may be manufactured, a housing 110 having a rather complicated flow path structure inside as illustrated in FIG. 1 may be easily manufactured, and the desired design specification may be implemented as precisely as possible.

More specifically, in the microfluidic reactor 100 according to an exemplary embodiment of the present invention, a plurality of unit flow paths located therein are formed together while the housing 110 is manufactured through ultra-high-resolution 3D printing, and thus, the plurality of unit flow paths are not present separately from each other, but exist in an integrated form in a single housing 110.

As such, in the microfluidic reactor 100 according to an exemplary embodiment of the present invention, as a plurality of unit flow paths are formed in an integrated form within a single housing 110, uniform flow rate distribution to the plurality of unit flow paths is possible. As a result, the microfluidic reactor 100 according to an exemplary embodiment of the present invention may improve the production yield by securing the uniformity of the ultrafast chemical reaction performed in the plurality of unit flow paths.

In addition, even when the production scale is expanded by introducing a microfluidic reaction device 200 including a plurality of microfluidic reactors 100, uniform distribution capability may be entirely secured even with respect to the plurality of unit flow paths included in the plurality of microfluidic reactors 100, thereby securing scalability for commercialized production.

Meanwhile, the microfluidic reactor 100 according to an exemplary embodiment of the present invention may secure a precise flow rate control capability by having a flow path structure integrated in the housing 110 as described above.

That is, in an ultrafast chemical reaction requiring a residence time of less than 1 second, the microfluidic reactor 100 according to an exemplary embodiment of the present invention may implement a plurality of unit flow paths having a uniform shape at a precise level in the housing 110 having an integrated structure, and thus, it is possible to precisely control the residence time of the fluid present in the unit flow path. Through this, the microfluidic reactor 100 according to an exemplary embodiment of the present invention may secure sufficient commerciality while using an intermediate having an ultrafast lifespan of less than 1 second.

As a specific example, the housing 110 may be formed in a hexahedral shape as illustrated in FIG. 1B. As such, when the housing 110 is formed in a hexahedral shape, the inlets 135 to 137 through which the fluids may be introduced are disposed on three side surfaces of the hexahedron except for the upper surface and the lower surface, and the outlet 138 may be disposed on the remaining side surface of the hexahedron. That is, the inlets 135 to 137 and the outlet 138 may be arranged to be spaced apart from each other along the fourth side surface of the hexahedron such that there is an advantage in that the flow path structures arranged side by side along the height direction of the housing 110 may be stably arranged like a parallel connection structure to be described below.

Hereinafter, the flow path structure formed inside the housing 110 will be described in detail with reference to the drawings.

Figure 5A:
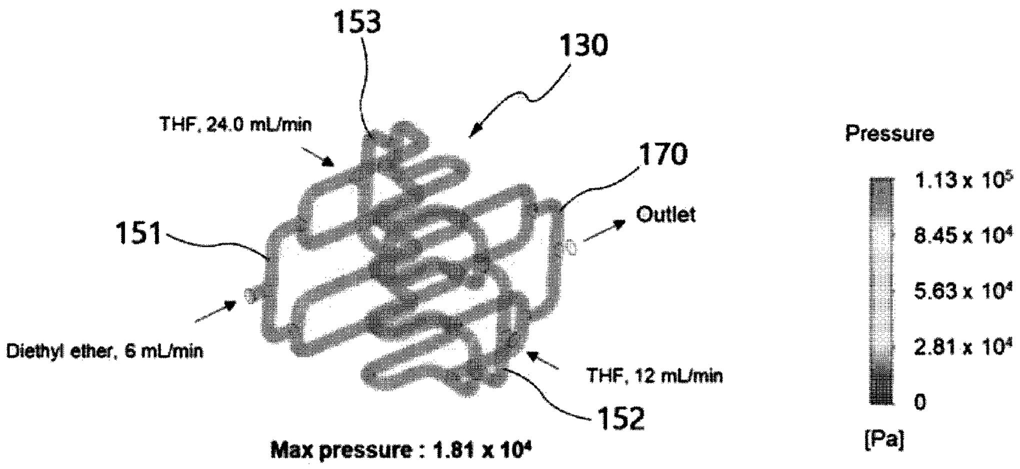
Figure 6A:
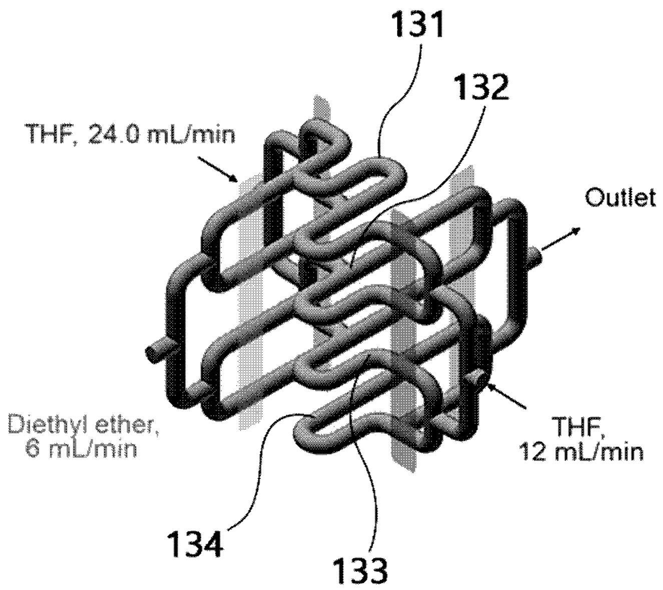
FIG. 6A shows the computational fluid dynamics (CFD) simulation conditions for the flow distribution confirmation in the 4N-PMR.
Figure 6B:
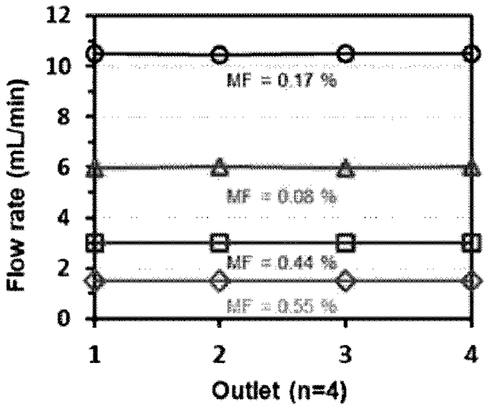
FIG. 6B shows the flow distribution simulation results in the 4N-PMR. Each color represents the location where the data is obtained.

Inside the housing 110, as illustrated in FIGS. 5A and 6A, a unit flow path module 130 including a plurality of unit flow paths 131 to 134, a branch flow path module 150 including a plurality of branch flow paths 151 to 153, and a single collection flow path 170 may be disposed in a form integrally connected to each other. Hereinafter, the structure in which the unit flow path module 130, the branch flow path module 150 and the collection flow path 170 are organically connected inside the housing 110 will be hereinafter defined as a 'flow path structure'.

In this case, all of the flow path structures may have a predetermined space such that the fluid may flow therein, and preferably have a circular vertical cross-section in order to minimize the dead volume of the flowing fluid and to uniform the pressure distribution as a whole.

In addition, the flow path structure does not mean a member that is independently separable from the housing 110, but should be understood to refer to a space structure formed inside the housing 110. That is, the flow path structure is a space structure inside the housing 110 formed when the housing 110 is manufactured by the 3D printing process as described above, and it may be integrally formed with the housing 110. That is, as described above, the microfluidic reactor 100 according to an exemplary embodiment of the present invention may have a plurality of flow paths existing in an integrated form with a single housing 110, and as such, it is possible to secure uniform fluid distribution capability and precise retention control capability optimized for ultrafast chemical reaction through the integrated flow path in the housing 110.

Referring to FIG. 6A, the flow path structure may include a unit flow path module 130 including a plurality of unit flow paths 131 to 134.

In this case, as illustrated in FIG. 5A, the unit flow paths 131 to 134 constituting the unit flow path module 130 may have N inlets 135 to 137 and a single outlet 138 such that N (3 in the drawing) fluids are respectively introduced and mixed and then discharged.

Specifically, as shown in the drawing, when the unit flow paths 131 to 134 have three inlets including the first inlet to the third inlet 135 to 137, after the two types of fluids introduced from the first inlet 135 and the second inlet 136 are mixed to generate a first mixed fluid, the first mixed fluid is additionally mixed with the fluid introduced from the third inlet 137, and the mixture may finally flow out of the housing 110 through the outlet 138.

Meanwhile, as a result of performing repeated experiments for more effective ultrafast synthesis, the inventors of the present invention confirmed that, when the inner diameter of the vertical cross-section (circle) of the flow path through which the first mixed fluid moves is 500 μm, the distance that the first mixed fluid moves to be mixed with the fluid introduced from the third inlet after being mixed is about 10 mm, and the movement time (residence time) thereof is within a maximum of 16 ms, the mixing efficiency of the fluid may be maximized. In particular, when the inner diameter of the vertical cross-section (circle) is set to 500 μm, it can be confirmed that the flow velocity for improving productivity may be secured as much as possible while minimizing the reduction in efficiency due to the pressure drop that may occur due to the diameter enlargement.

In an exemplary embodiment of the present invention, as illustrated in FIG. 6A, the unit flow path module 130 may include a total of four unit flow paths including first to fourth unit flow paths 131 to 134. In this case, the four unit flow paths 131 to 134 may be connected to each other in parallel. Herein, the meaning of being connected in parallel is a concept in contrast to a serial connection which means a state in which a plurality of flow paths are connected in series, and means that four unit flow paths 131 to 134 are arranged side by side. Meanwhile, in the present specification, the microfluidic reactor having a structure in which four unit flow paths are connected in parallel is named "4N-PMR", and in the following description, the 4N-PMR will be exemplified. However, it should be noted that the flow path structure of the microfluidic reactor according to an exemplary embodiment of the present invention is not limited to 4N-PMR, and it may include less than 4 or more than four unit flow paths as necessary.

In this case, as shown in the drawing, the plurality of unit flow paths may be arranged in parallel along the height direction of the housing 110 and connected to each other in parallel. In the microfluidic reactor 100 according to an exemplary embodiment of the present invention, by arranging a plurality of flow paths side by side along the height direction of the housing 110 as described above, a plurality of unit flow paths may be disposed space-efficiently inside the housing 110, and also, the structures of the branch flow paths 151 to 153 and the collection flow path 170 to be described later may be simplified as much as possible.

In this regard, in order to connect the four unit flow paths 131 to 134 in parallel as described above, a branch flow path module 150 that is connected to the unit flow path module 130 may be introduced in the microfluidic reactor 100 according to an exemplary embodiment of the present invention.

Figure 5B:
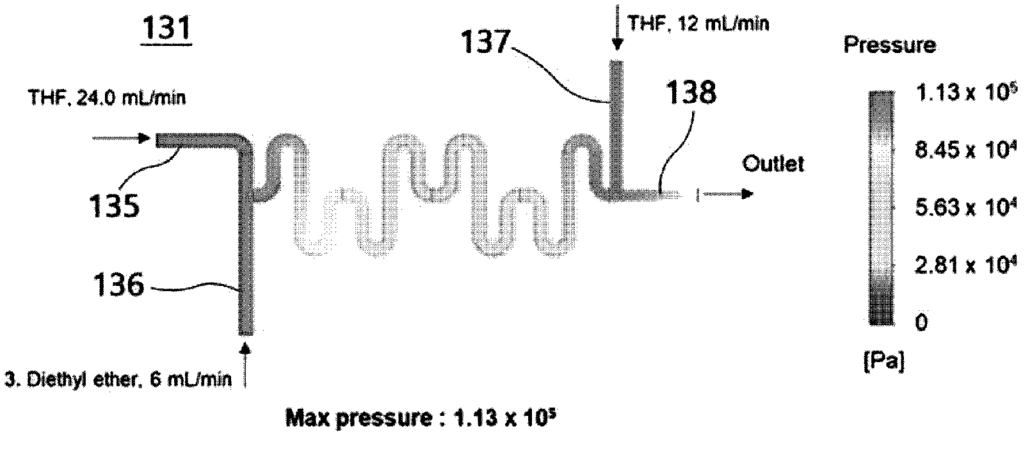

In this case, the branch flow path module 150 may include the number of branch flow paths 151 to 153 corresponding to the plurality of outlets 135 to 137 provided in the unit flow paths 131 to 134. More specifically, as illustrated in FIG. 5B, when one unit flow path 131 to 134 includes three inlets 135 to 137, 3 branch flow paths 151 to 153 may also be provided.

In this case, one branch flow path 151 may be formed to have, for example, a four-pronged branching structure, and thus may be simultaneously connected to the four first inlets 135 formed in each of the four unit flow paths 131 to 134.

Similarly, the other branch flow path 152 also has a four-pronged branching structure such that it may be simultaneously connected to the four second inlets 136 formed in each of the four unit flow paths 131 to 134, and another branch flow path 153 may be connected to the four third inlets 137 formed in each of the four unit flow paths 131 to 134.

In addition, since the branch flow paths 151 to 153 are formed together with the four unit flow paths 131 to 134 through 3D printing as described above, they may exist in an integrated form rather than being separately manufactured and then connected. As such, since each of the branch flow paths 151 to 153 and the four unit flow paths 131 to 134 exist in an integrated form with each other, the fluid may be uniformly branched with respect to the plurality of unit flow paths. Through this, the four unit flow paths 131 to 134 may maintain parallel connection while maintaining the same flow velocity.

In other words, in the microfluidic reactor 100 according to an exemplary embodiment of the present invention, the branch flow path module 150 and the unit flow path module 130 are integrally formed inside the housing 110 in the process of manufacturing the housing 110 through a 3D printing process, instead of being manufactured in the form of a tube or a pipe and bonded to each other, and thus, the coupling portion may be omitted, and a more fluidically precise flow path structure may be implemented, and manufacturability may be improved according to the omission of the bonding process.

In addition, the microfluidic reactor 100 according to an exemplary embodiment of the present invention may maintain all flow factors such as residence time and flow rate of each of a plurality of unit flow paths uniformly based on the above-described precision such that while scaling up the microfluidic reactor 100, there is an advantage in that the quality between each unit flow path may be uniformly maintained. As a result, it is possible to effectively expand the production scale of the microfluidic reactor 100, which was somewhat limited in terms of productivity, enough to be applied to actual industrial sites.

The microfluidic reactor 100 according to an exemplary embodiment of the present invention may include a collection flow path 170 in addition to the branch flow path module 150 in order to connect the four unit flow paths 131 to 134 in parallel.

In this case, the collection flow path 170 is a flow path that performs a function in contrast to the branch flow paths 151 to 153 for distributing the fluid introduced into the housing 110, and it is a flow path for collecting all of the final mixed fluid produced by passing through the four unit flow paths 131 to 134, respectively, and sending to the outside of the housing 110.

To this end, the collection flow path 170 may be formed in a four-pronged branching structure similar to the branch flow paths 151 to 153, and the four-pronged branching structure may be connected to an outlet 138 respectively formed in each of the four unit flow paths 131 to 134.

In addition, the collection flow path 170 exists in an integrated form with the four unit flow paths 131 to 134 (not connected after being separated from each other and manufactured), similar to the aforementioned branch flow paths 151 to 153. Through this, the microfluidic reactor 100 according to an exemplary embodiment of the present invention may secure the aforementioned precision residence time control capability.

The microfluidic reactor 100 according to an exemplary embodiment of the present invention may further include a metal frame 180 formed to surround a portion of the outer surface of the above-described housing 110.

In this case, when the fluid is supplied to the end portions (the end portion side exposed on the outer surface of the housing 110) of the branch flow paths 151 to 153 or the collection flow path 170 disposed in the housing 110 or a tube 190 for receiving the fluid is connected, the metal frame 180 may perform a function of supporting the tube 190 to maintain a fixed position.

To this end, the metal frame 180 may include a plurality of coupling holes 182 having a penetrating shape such that a tube fixing member 184 may be screwed as illustrated in the drawing. The tube fixing member 184 located on the coupling hole 182 may be fixed by pressing the outer surface of the housing 110 by advancing to the inside of the metal frame 180 according to the rotation.

In an exemplary embodiment of the present invention, for example, the tube fixing member 184 may be a tube fitting having a thread formed at a portion coupled to the coupling hole 182, and having a through-hole formed therein such that a tube for supplying a fluid may be disposed through the through-hole. The tube extended through the through-hole may be connected to the branch flow path module 150 or the collection flow path 170 exposed on the outer surface of the housing 110 in a state of being effectively fixed by the tube fixing member 184.

In this case, the number of the coupling holes 182 may be the same as the combined number of the branch flow paths 151 to 153 and the collection flow path 170. For example, when three branch flow paths 151 to 153 and a single collection flow path 170 are included as in the above-described 4N-PMR structure, the number of the coupling holes 182 may be four.

As such, the microfluidic reactor 100 according to an exemplary embodiment of the present invention adopts a coupling structure through a metal frame 180 formed with a coupling hole 182 and a tube fixing member 184 fastened to the metal frame such that separation and coupling for movement or disassembly of the microfluidic reactor 100 may be easily performed.

In addition, as described below, even when a large-scale microfluidic reactor 200 is formed by connecting a plurality of microfluidic reactors 100 in parallel, a simple tube fixing member 184 fastening process may be performed instead of a flow path connection process that requires precise work so as to scale up quickly.

In an exemplary embodiment of the present invention, one end of each tube connected to the branch flow path module 150 and the collection flow path 170 may be connected to a known fluid pump. As such a fluid pump forms positive or negative pressure in the tube, a large amount of fluid may be supplied to the microfluidic reactor 100 in one direction or may be moved outward from the housing 110. In particular, due to the characteristics of the microfluidic reactor 100 in which mixing efficiency reacts very sensitively according to changes in flow rate and residence time, flow characteristics within the flow path structure need to be controlled very precisely. Therefore, the pump connected to the tube may be formed as a fluid pump that can control the flow very precisely, for example, similar to a syringe pump.

Figure 8A:
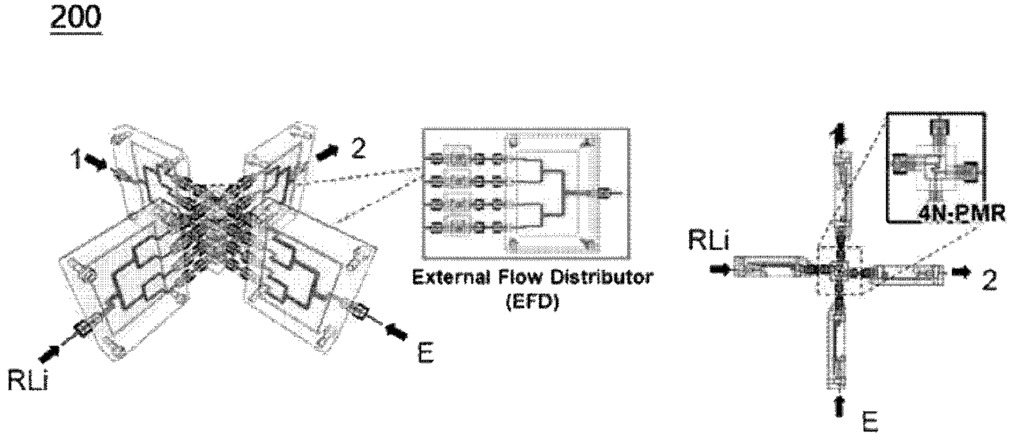
Figure 8B:
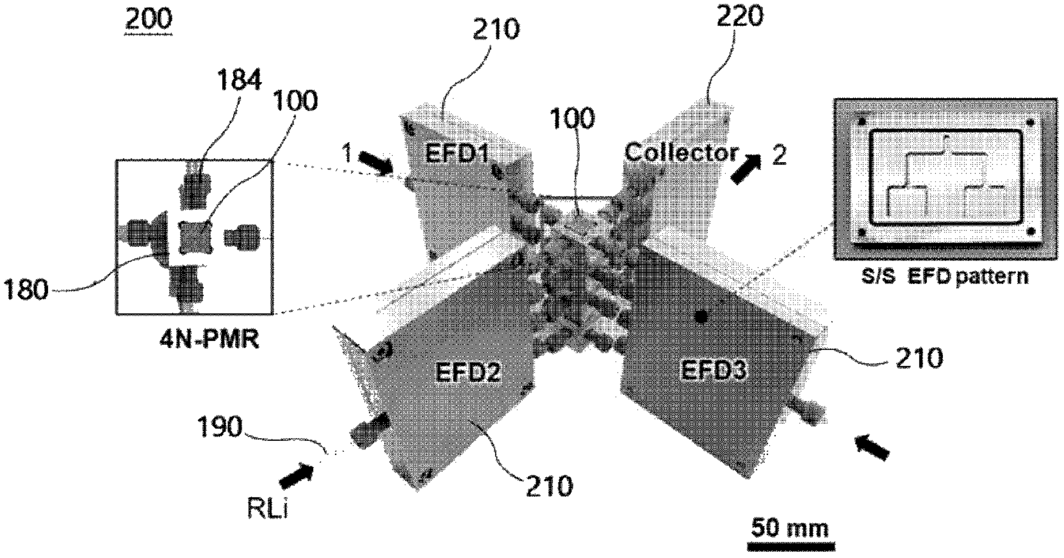

Meanwhile, in an exemplary embodiment of the present invention, as illustrated in FIG. 8B, by including a plurality of the aforementioned microfluidic reactors (e.g., 4N-PMR) and connecting them in parallel, it is also possible to configure a microfluidic reaction device 200 having a more scaled-up production scale. Through this, it is possible to obtain a greater amount of the mixed fluid in the same amount of time.

Specifically, the microfluidic reaction device 200 may include, for example, four microfluidic reactors 100 having the same structure. In this case, when the individual microfluidic reactor 100 is formed of 4N-PMR including four unit flow paths, a mixed fluid may be produced through 16 unit flow paths as a whole. In the present specification, a microfluidic reaction device in which four microfluidic reactors are connected in parallel is named "16N-PMR", and in the following description, the 16N-PMR will be exemplified and described. However, it should be noted that the structure of the microfluidic reaction device according to an exemplary embodiment of the present invention is not limited to 16N-PMR, and it may include less than four or more than four microfluidic reactors as necessary (the 128N-PMR exceeding 16N-PMR will be described through the following description).

The four microfluidic reactors described above may be connected in parallel through an external distributor 210. In this case, the external distributor 210 may have a structure similar to the aforementioned branch flow paths 151 to 153, and may have a four-pronged branching structure so as to supply a fluid uniformly toward the branch flow paths 151 to 153 of the four microfluidic reactors 100 as illustrated in the drawing, and may be simultaneously connected with the inlet ends of the plurality of branch flow paths 151 to 153 provided in each of the plurality of microfluidic reactors 100. In this case, the number of external distributors 210 may vary depending on the number of fluids supplied to the microfluidic reactor 100, and for example, when a unit flow path has three inlets and three fluids are mixed, it may have three external distributors 210 so as to correspond thereto.

Next, the mixed fluid produced through the four microfluidic reactors may be collected through an external collector 220. The external collector 220 may also have a structure similar to that of the aforementioned collecting flow path 170, and specifically, it may be formed to have a four-pronged branching structure to be respectively connected to the outlet ends of the plurality of collecting flow paths 170 provided in each of the four microfluidic reactors 100.

Meanwhile, the external distributor 210 and the external collector 220 constituting the microfluidic reaction device 200 may be individually connected to a fluid pump so as to supply the fluid to the housing 110 or discharge it out of the housing 110. As such, the microfluidic reaction device 200 according to an exemplary embodiment of the present invention may uniformly supply a fluid at a time to a plurality of microfluidic reactors (four in the case of 16N-PMR) with only a single fluid pump, and thus, it has the advantage of minimizing the demand for the pump by utilizing the capacity of the pump as much as possible. Through this, in the case of the microfluidic reaction device 200 according to an exemplary embodiment of the present invention, it is possible to obtain a reasonable microfluidic reaction device that is economically efficient and can sufficiently expand the production scale.

Figure 17:
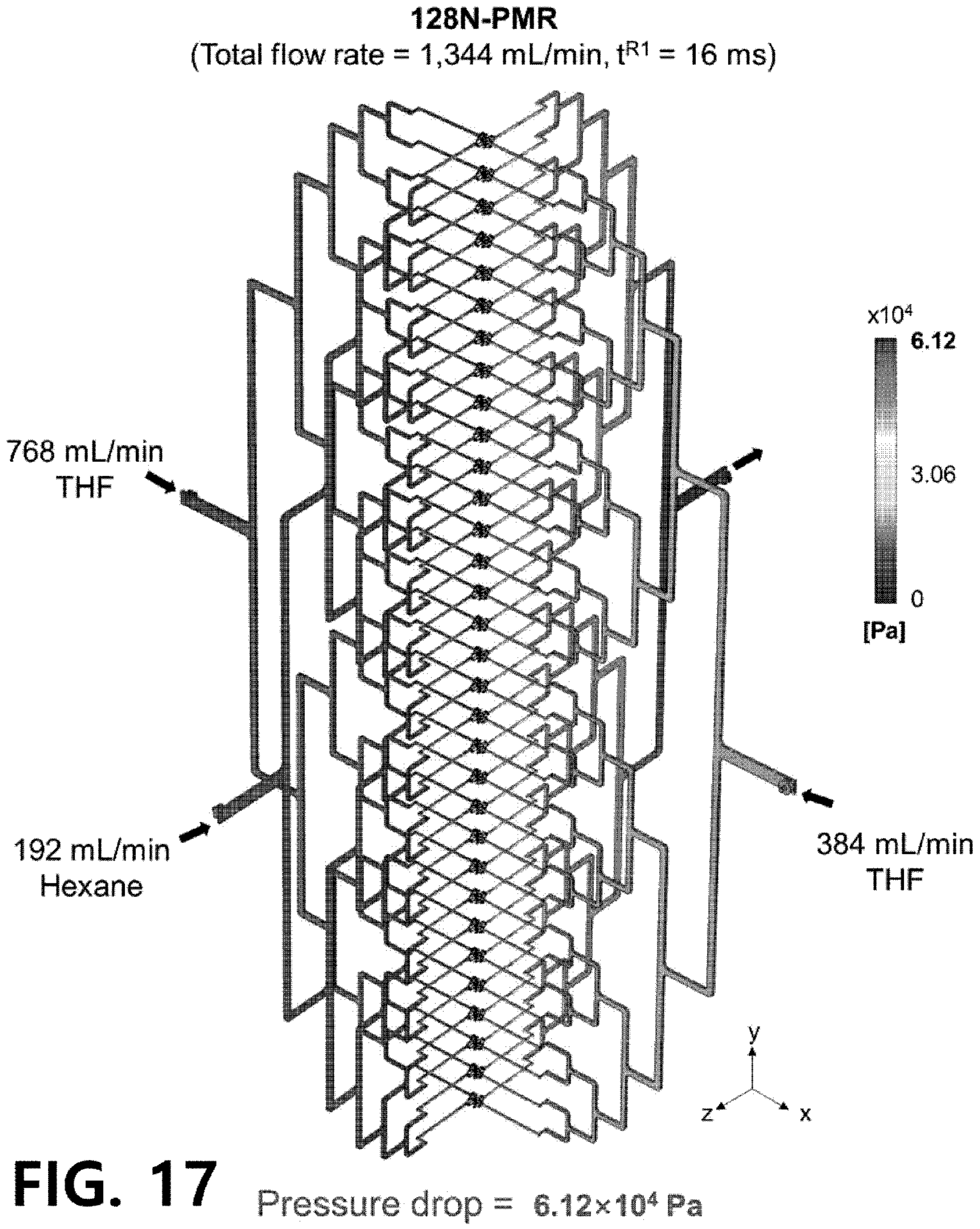
FIG. 17 shows the pressure drop results obtained by the computational fluid dynamics (CFD) simulation for a conceptual design of 128N-PMR at a residence time ($t^{R1}$) of 0.016 s.

As a specific example, the scale-up using the microfluidic reaction device 200 according to an exemplary embodiment of the present invention may be expanded to 128N-PMR (microfluidic reaction device having 128 unit flow paths), as illustrated in FIG. 17. For example, the 128N-PMR may be implemented by connecting 32 4N-PMRs in parallel (certainly, it is possible to implement a large-scale microfluidic reaction device exceeding 128N-PMR with the same principle.)

In this case, since the plurality of unit flow paths, branch flow paths and collecting flow paths included in a single microfluidic reactor 100 (e.g., 4N-PMR) exist in an integrated form in the housing 110, it is possible to uniformly distribute the fluid and precisely control the residence time for a plurality of flow paths in the single microfluidic reactor 100.

At the same time, as all 32 4N-PMRs are precisely manufactured through high-resolution 3D printing, uniformity may be ensured, and as a result, as illustrated in FIG. 17, uniform fluid distribution and precise residence time control are possible for 128 unit flow paths.

Through this, the microfluidic reaction device 200 according to an exemplary embodiment of the present invention may form an ultrafast chemical reaction with respect to a large-capacity fluid at 1,344 mL/min per unit time, while ensuring a sufficient production yield.

The method for controlling a chemical reaction according to an exemplary embodiment of the present invention is a method for controlling a highly reactive intermediate in the microfluidic reactor 100 and the microfluidic reaction device 200 described above.

Accordingly, the chemical reaction may be an ultrafast chemical reaction, and preferably, an ultrafast chemical reaction controlling a highly reactive intermediate. The highly reactive intermediate has very short residence times of less than milliseconds.

For example, the ultrafast chemical reaction may be an ultrafast synthesis reaction using an aryllithium intermediate and an electrophile.

The aryllithium intermediate may be a highly reactive compound that can be used for synthesizing precursors for antiplatelet active compounds, letrozole for the treatment of breast cancer and macbecin I, which is an antitumor antibiotic, but is not limited thereto. Specific examples of ultrafast synthesis reactions using aryllithium intermediates and electrophiles are described in detail in Examples 4 and 8.

The 4-fold increase in productivity in ultrafast synthesis using the microfluidic reactor according to the present invention has been demonstrated by ultrafast synthesis to control highly reactive aryllithium intermediates that can be used for synthesizing precursors for antiplatelet active compounds, letrozole for the treatment of breast cancer and macbecin I, which is an antitumor antibiotic, at various optimal temperatures.

The remarkable increase in productivity in the ultrafast synthesis using the microfluidic reaction device (16N-PMR) according to the present invention is that three drug scaffolds including bis-(4-cyanophenyl)methanol, which is a letrozole precursor, are produced in a single microfluidic reactor (1.8 to 2 g $min^{-1}$) were synthesized with almost 16 times the productivity. The scale-up synthesis of drug scaffolds via labile aryllithium species was achieved with high controllability and low pressure drop through a numbering-up strategy.

Therefore, the ultrafast synthesis using the microfluidic reactor or microfluidic reaction device according to the present invention is significant in that it enables ultrafast synthesis that is not possible in the existing batch reaction, and at the same time improves the productivity of pharmaceutical compounds to an industrial level with a yield similar to that of a single microfluidic reactor.

Although an exemplary embodiment of the present invention has been described above, the spirit of the present invention is not limited to the exemplary embodiment presented in the present specification, and those skilled in the art who understand the spirit of the present invention will be able to easily suggest other exemplary embodiments by modifying, changing, deleting or adding components within the scope of the same spirit, but this is also said to be within the scope of the present invention.

Example 1

Manufacture of 4 Numbering-Up Printed Metal Microreactor 4N-PMR 1-1. Sample Preparation 2-Bromophenyl isothiocyanate was purchased from Alfa Aesar, and 4-bromobenzonitrile, 1-iodo-3-nitrobenzene and 4-formylbenzonitrile were purchased from TCI Co. Ltd. n-Butyllithium, phenyllithium, phenyl isocyanate, iodomethane, methyl triflate and tributyline chloride were purchased from Sigma-Aldrich. THF, hexane and $Et_2O$ were purchased from Sigma-Aldrich as dry solvents and used without further purification.

1-2. Manufacture of SMR

Stainless steel (SUS316) microtube reactors with inner diameters of 250 and 1,000 μm were purchased from GL Science and cut to appropriate lengths (4.0, 12.5, 50 and 200 cm). A stainless steel (SUS304) T-shaped micromixer having an inner diameter of 500 μm was manufactured by Sanko Seiki Co. The micromixer and the microtube reactor were connected with stainless steel fittings (GL Science, 1/16" OUW) to construct a microreaction system.

1-3. Manufacture of 4N-PMR

Figure 2:
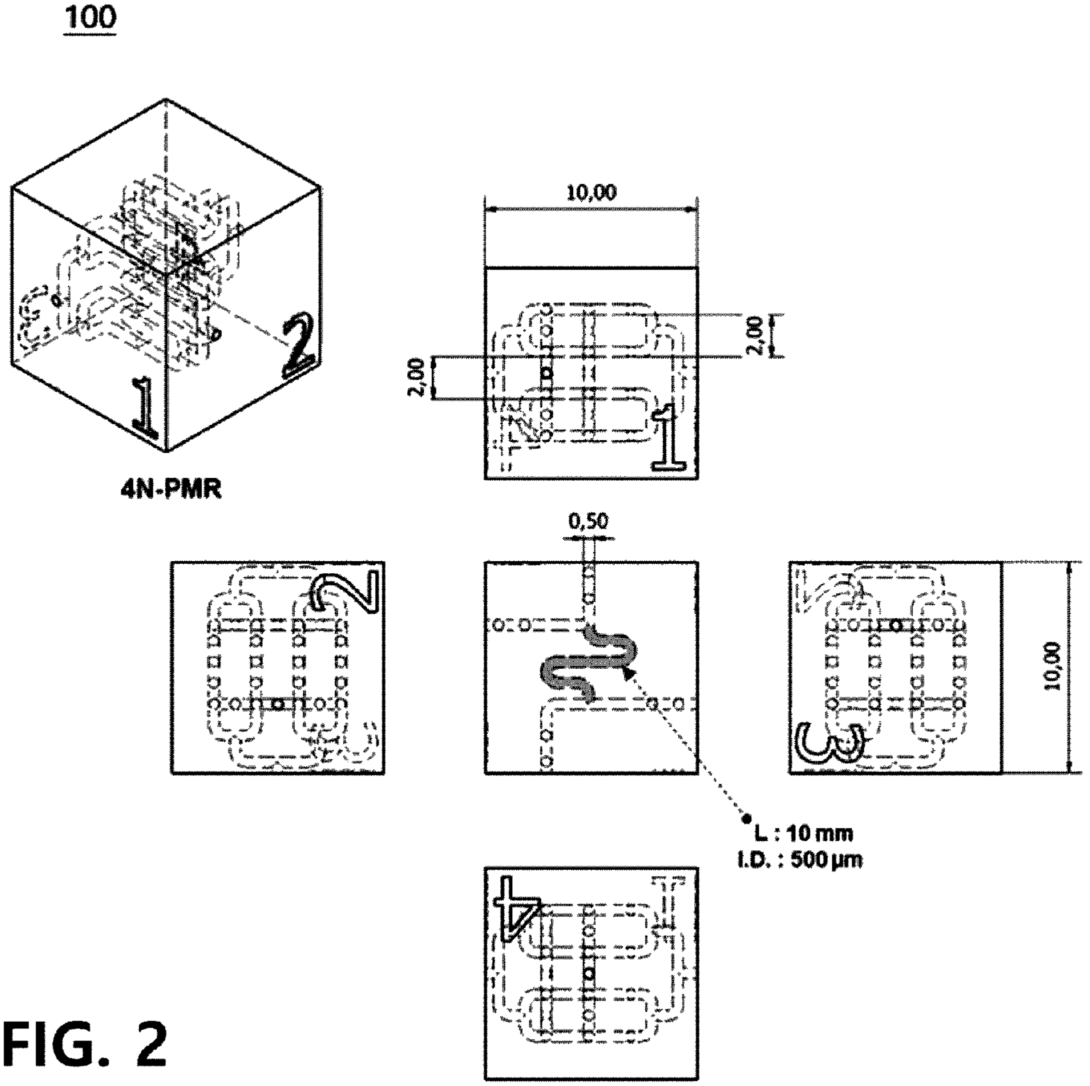
FIG. 2 is a schematic diagram of the cross-sectional layout and the detailed dimensions of the 4N-PMR.

The miniature 4N-PMR composed of a seamless interconnected array of four SMRs and multiple splitter channels, which was designed to be a built-in monolithic structure (FIGS. 1A and 2). Specifically, 4N-PMR was designed with Inventor, which is Autodesk's 3D-based computer-aided design (CAD) program, and manufactured as an SLM type of 3D MicroPrint GmbH (DMP 50 GP). As the metal powder, 17-4PH chromium-nickel-copper alloy stainless steel powder at less than 5 μm was used. An aluminum metal frame was used for the tight connection between the 4N-PMR and the flow piping. High-purity PTFE tubing (1/16" o.d., 0.03" i.d.) and polyethylene ether ketone 1/4-28 nuts from IDEX HEALTH & SCIENCE (WA, USA) were combined and connected to the reactor via an aluminum metal frame. A stainless steel (SUS316) microtube reactor with an inner diameter of 1,000 μm was cut to appropriate lengths (50, 200 and 800 cm) and connected to flow tubing with stainless steel fittings (1/16" OUW) to construct a microreaction system.

The microfluidic system was immersed in a cooling water bath to control the temperature. Reagents were continuously injected into a microfluidic system using either a gas sample injection syringe (50 mL, inner diameter: 27.6 mm) purchased from SGE Analytical Science or a PHD Ultra syringe pump (Harvard Apparatus) equipped with a constant flow gradient HPLC piston pump (Scientific Systems). After a steady state was reached, the product solution was collected for 30 seconds unless otherwise noted.

GC analysis was performed on an Agilent Technologies 7890A gas chromatography (Agilent Tech., USA/Germany) using a fused silica capillary column (column, 0.25 mm×30 m). $^1H$ and $^{13}C$ NMR spectra were recorded on a Bruker Avance III (500 MHz for both $^1H$ NMR and $^{13}C$ NMR) spectrometer using $CHCl_3$ as standard for $CDCl_3$ unless otherwise noted. Electron ionization (EI) mass spectra were recorded on an Agilent Technologies 5975C VL MSD spectrometer.

Example 2

Simulations of Computational Fluid Dynamics (CFD) of SMR and 4N-PMR Microfluidic Reactors Before manufacturing by metal 3D printing, the simulations of computational fluid dynamics (CFD) were used to examine the mixing efficiency and distribution performance of 4N-PMR (b of FIG. 1B).

2-1. Simulations of Computational Fluid Dynamics (CFD)

Numerical computational fluid dynamics (CFD) studies were performed to evaluate the pressure drop, distribution performance and mixing efficiency of 3D models corresponding to SMR, modified SMR and 4N-PMR. CFD simulations were performed with commercial numerical software FLUENT 2021 R1 (ANSYS, INC.) and COMSOL Multiphysics 5.4. Based on the finite volume method, the equations were discretized without slip boundary conditions on the channel walls, and linear velocity and pressure conditions for the inlet and outlet were established. Calculations were performed based on the Navier-Stokes equation. It is defined as a general slope of zero for all flow variables except pressure. The mixing degree can be quantified by mixing efficiency according to Equations 1 and 2 below.

$$\eta = 1 - \sqrt{\sigma^2/\sigma_{max}^2} \quad \text{[Equation 1]}$$

$$\sigma = \sqrt{\frac{1}{N}\sum_{j=1}^{N}(c_j - c_{in})^2} \quad \text{[Equation 2]}$$

N, which is the standard concentration deviation of the section, is the number of nodes in the section, $c_j$ is the sample node local concentration in section j, $c_{in}$ is the mean concentration at the inlet, and $\sigma_{max}$ is the maximum standard deviation of the concentration.

Figure 4A:
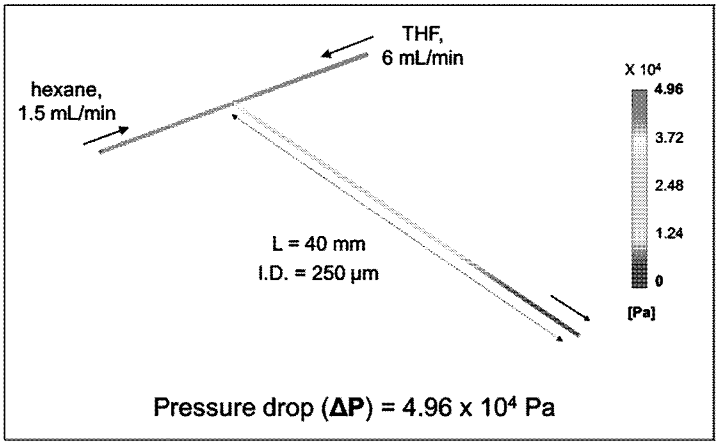
Figure 4B:
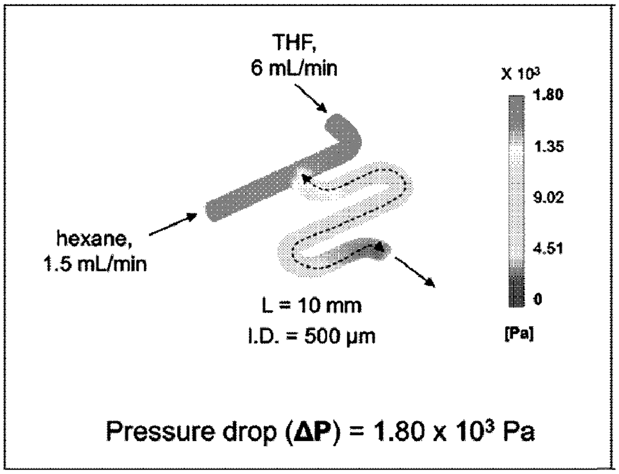

Further, in to confirm the uniform distribution of the injection solution in 4N-PMR, CFD simulation was used to quantify the distribution performance of the flow distributor by calculating the maldistribution factor (MF) and flow rate at a specific position of the distributor channel (FIGS. 4A and 4B). MF was calculated according to Equation 3 below.

$$MF\ (\%) = \sqrt{\frac{1}{n-1}\sum_{i=1}^{n}\left(\frac{m_i - \overline{m}}{\overline{m}}\right)^2} \times 100 \quad \text{[Equation 3]}$$

If n is the number of capillaries, mi is the mass flow rate of the $i^{th}$ capillary, and $\overline{m}$ is the average mass flow rate of the microfluidic reactor. A low MF value indicates a uniform flow distribution between the individual microfluidic reactors.

2-2. Results of SMR and Modified SMR

Figure 21:
FIG. 21 shows comparative simulations of mixing efficiency at different residence times of SMR and modified SMR at flow rates of 6 mL $min^{-1}$ of THF and 1.5 mL $min^{-1}$ of hexane for each outlet.
Figure 21:
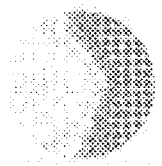
Figure 21:
Figure 21:
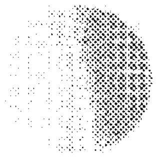
Figure 21:
Figure 21:
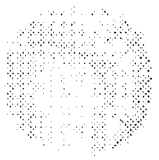
Figure 21:
Figure 21:
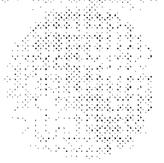
Figure 21:
Figure 21:
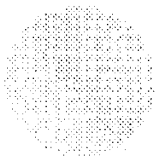
Figure 21:
Figure 21:
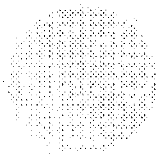

FIG. 21 shows comparative simulations of mixing efficiency at different residence times of SMR and modified SMR at flow rates of 6 mL $min^{-1}$ of THF and 1.5 mL $min^{-1}$ of hexane for each outlet. As confirmed in FIG. 21, the modified SMR exhibited 99% efficiency at a residence time of >5 ms, similar to the capillary SMR, whereas the pressure drop of the modified SMR, as confirmed in FIGS. 4A and 4B, was significantly lowered by 28 times under the same flow conditions due to the larger diameter.

2-3. Results of 4N-PMR

As confirmed in FIGS. 5A and 5B, the maximum pressure in the series microfluidic reactor is expected to be 6.24 times that of 4N-PMR. In addition, as shown in FIGS. 6A and B, it was confirmed that the pressure drop inside the microfluidic reactor was smaller in the channel structure of 4N-PMR than in the channel structure in which four 10 mm-long reactor channel parts were connected in series.

Figure 3:
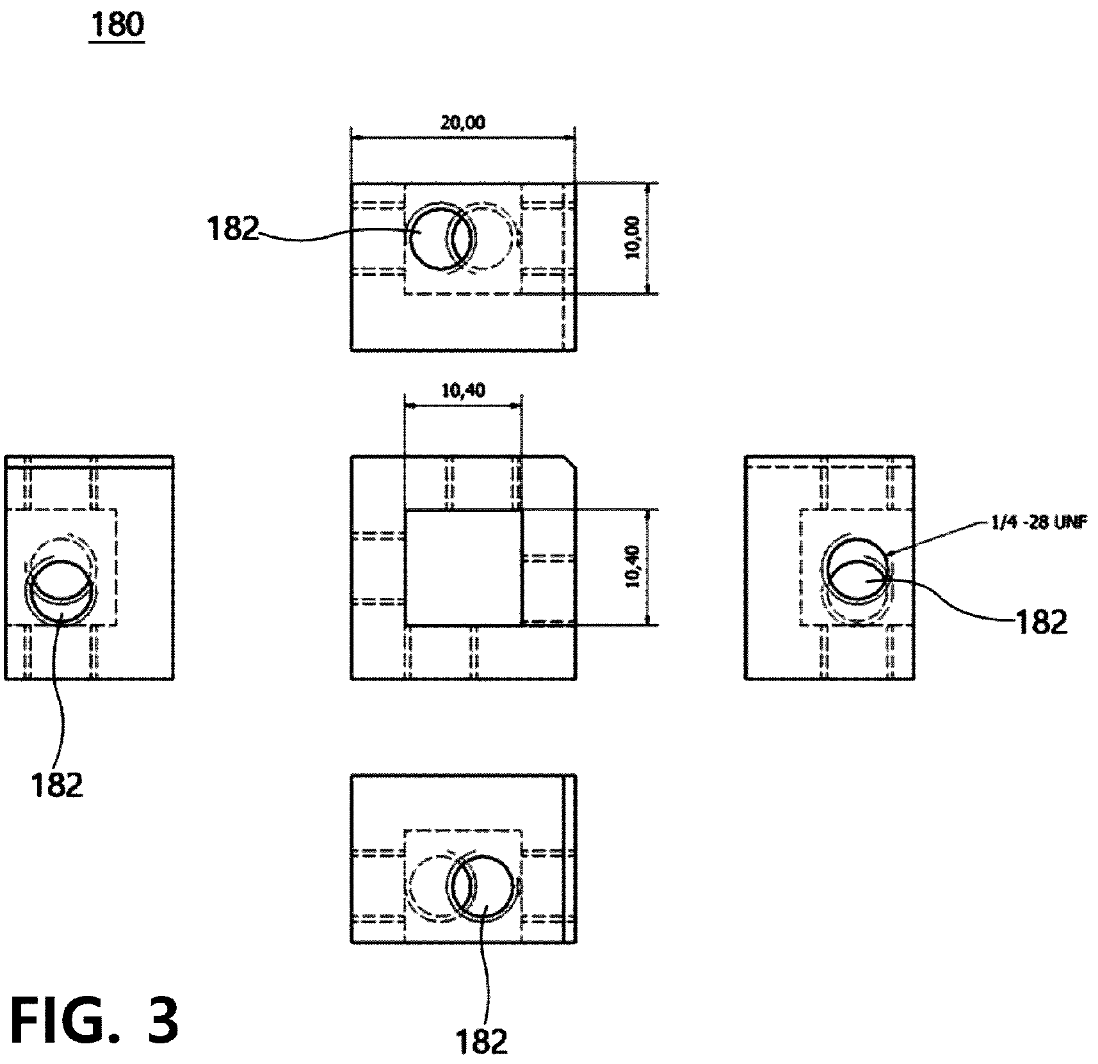
FIG. 3 is a schematic diagram of the cross-sectional layout and the detailed dimensions of the frame for the 4N-PMR.

Finally, 4N-PMR was fabricated through high-resolution 3D printing based on the verified design (c-1 and c-2 of FIG. 1B). Through high-resolution 3D printing technology, it is possible to fabricate a channel structure with the same geometric structure as the design, and it was tested by using X-ray computerized tomography (CT) scan (c-1 in FIG. 1B) and 3D visualization images (c-2 of FIG. 1B). An aluminum metal frame was used for the tight connection between the 4N-PMR and the flow piping (FIG. 3).

Since the circular cross-sectional shape of the channel obtained by high-resolution 3D printing provides excellent mixing efficiency even in the planar geometry of the channel structure, the internal design of 4N-PMR could be achieved in a space-saving manner. Additionally, the integrated design of the 4N-PMR eliminates the need to connect with stainless steel fittings, which enables the use of a 10 mm-long reactor section (Ø=500 μm) through which the unstable intermediate passes and two sequential branching flow distributor channels without connectors. As a result, 4N-PMR could be designed in a more compact way (1 $cm^3$) than the conventional microfluidic reactor.

Example 3

Simulations of Heat Distribution Computational Fluid Dynamics (CFD) of SMR and 4N-PMR Microfluidic Reactors The rate of heat flow resulting from the halogen-lithium exchange reaction in R1 of SMR and 4N-PMR was calculated by multiplying the concentration (c) and flow rate (Q) of the aryl halide by the molar enthalpy (ΔH) of the reaction (Equation 4). The heat flow rates of SMR and 4N-PMR were calculated to be 0.3 W and 1.2 W, respectively, by using a concentration of 0.1 M, flow rates of 6 mL $min^{-1}$ and 24 mL $min^{-1}$ and a molar enthalpy of reaction 30 kJ $mol^{-1}$.

$$\text{Heat flow rate}=c\times Q\times \Delta H$$

$$\text{Heat flow rate in SMR}=0.1\ (\text{mol L}^{-1})\times 0.0001\ (\text{L s}^{-1})\times 30{,}000\ (\text{J mol}^{-1})=3\text{ W}$$

$$\text{Heat flow rate in 4N-PMR}=0.1\ (\text{mol L}^{-1})\times 0.0004\ (\text{L s}^{-1})\times 30000\ (\text{J mol}^{-1})=12\text{ W} \quad \text{[Equation 4]}$$

Figure 7A:
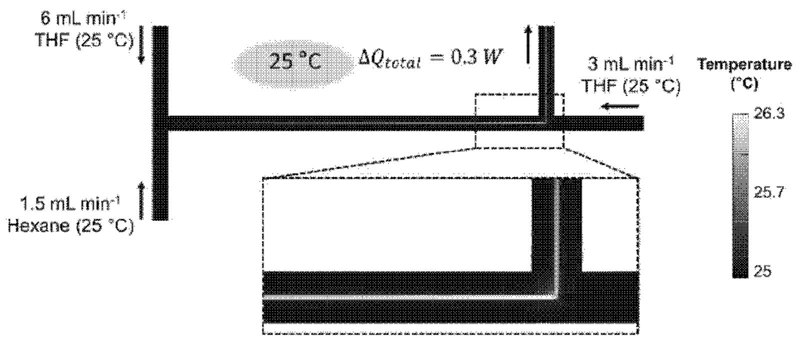
FIG. 7A shows the numerical heat distribution for the exothermic heat dissipation behavior resulting from the halogen-lithium exchange reaction in the R1 channel of the SMR.
Figure 7B:
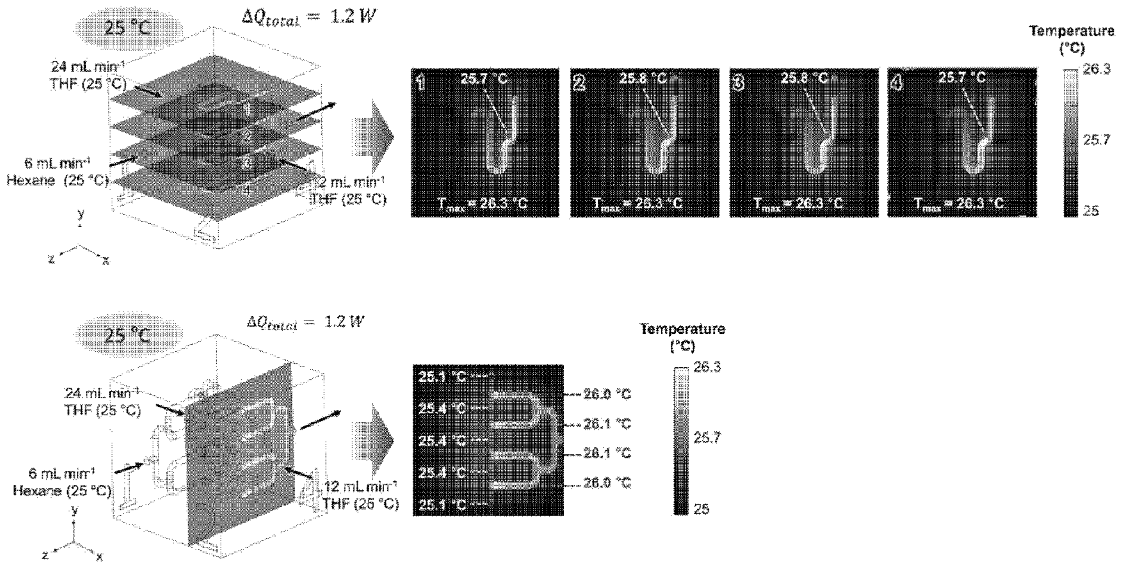
FIG. 7B shows the numerical heat distribution for the exothermic heat dissipation behavior resulting from the halogen-lithium exchange reaction in each of the internally stacked and modified SMRs inside the 4N-PMR (top) and the numerical heat distribution for the exothermic heat dissipation behavior resulting from the halogen-lithium exchange reaction in the built-in fluid collection device (bottom).

It was assumed that the temperature of the injected solution had sufficiently reached the water bath temperature through the pre-cooling unit. For the physical properties of the microfluidic reactor body, the density, heat capacity and thermal conductivity of stainless steel (7,800 kg $m^{-3}$, 480 J $kg^{-1}K^{-1}$, 17 W $m^{-1}K^{-1}$) were used. The density, heat capacity, thermal conductivity and viscosity modulus of THF (888 kg $m^{-3}$, 1,770 J $kg^{-1}$ $K^{-1}$, 0.18 W $m^{-1}$ $K^{-1}$ and 0.55 mPa s) and hexane (655 kg $m^{-3}$, 2,356 J $kg^{-1}$ $K^{-1}$, 0.12 W $m^{-1}$ $K^{-1}$ and 0.30 mPa s) were used for fluid properties. A constant temperature of 25° C. was used on the outermost surface of the microfluidic reactor. The maximum temperatures of the reaction mixtures at R1 of SMR and 4N-PMR were identical at 26.3° C. As confirmed in FIGS. 7A and 7B, the R1 inner surface temperature of SMR was 25.3° C., whereas the inner surface temperature of 4N-PMR was slightly higher at 25.7 to 25.8° C., but there was no significant difference. In addition, as confirmed in FIG. 7B, the temperature (25.4° C.) of the 4N-PMR body near the center was slightly higher than that near the edge (25.1° C.), but there was no significant difference. As a result, it was confirmed through computational simulation that there was no significant decrease in the efficiency of heat distribution due to reaction channel stacking in 4N-PMR compared to SMR.

Example 4

Figure 22:
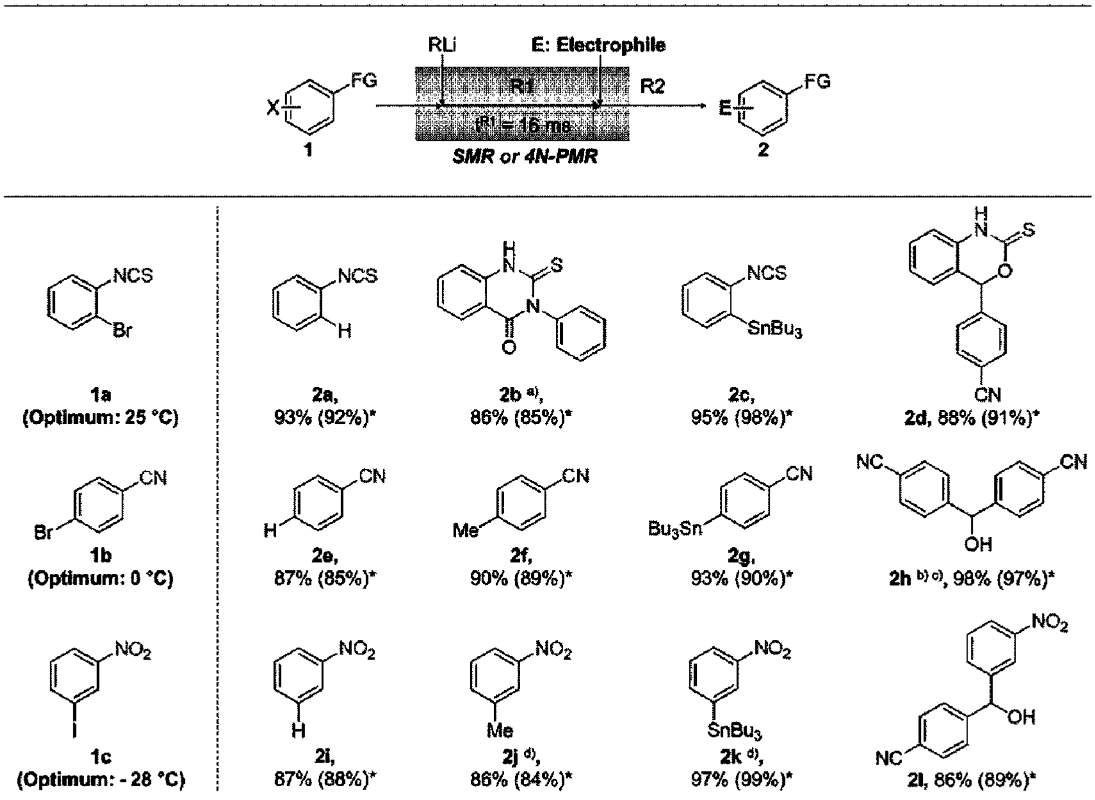
FIG. 22 shows ultrafast subsecond flow synthesis by using aryllithium intermediates including electron withdrawing groups and various electrophiles at different temperatures in the two reactors of SMR and 4N-PMR.

Ultrafast Flow Synthesis Using Aryllithium Intermediate and Electrophile for Performance Comparison of 4N-PMR and SMR The synthetic performance of the fabricated 4N-PMR was investigated compared to that of capillary SMR by performing a two-step ultrafast subsecond chemical reaction. The three types of aryllithium intermediates including electron-withdrawing groups were produced by the halogen-lithium exchange of functionalized aryl halide 1 at R1 over a wide range of temperatures and subsequent reactions with three electrophiles at R2 prior to cleavage of the intermediates (FIG. 22). FIG. 22 shows ultrafast subsecond flow synthesis by using aryllithium intermediates including electron withdrawing groups and various electrophiles at different temperatures in the two reactors of SMR and 4N-PMR.

Yields were determined by GC unless otherwise specified. The residence time in R2 was 2.2 s unless otherwise specified. Methanol (2a, 2e, 2i), phenyl isocyanate (2b), tributyltin chloride (2c, 2g, 2k), 4-formylbenzonitrile (2d, 2h, 2l), iodoethane (2f) and methyl triflate (2j) were used as electrophiles. * indicates the yield obtained through 4N-PMR. [a)] indicates the yield of isolated product. [b)] Determined by $^1$H NMR spectroscopy using 1,3,5-trimethoxybenzene as internal standard. [c)] The residence time in R2 was 0.56 s. [d)] The residence time in R2 was 9.0 s.

Figure 23:
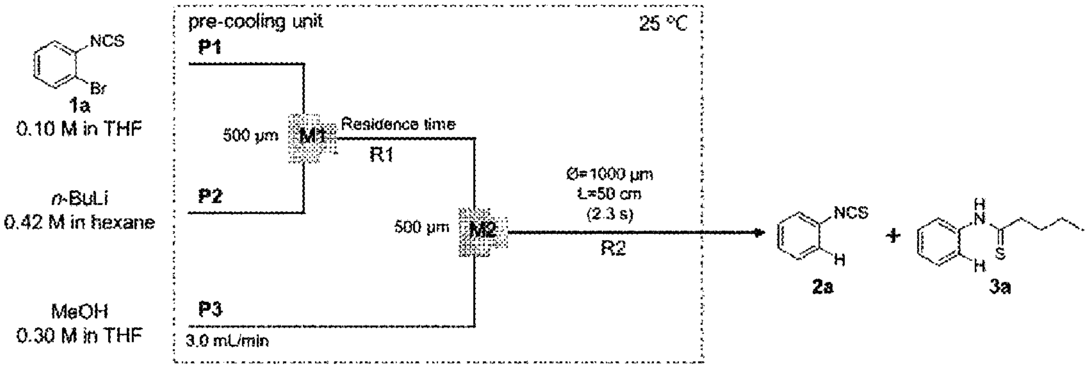
FIG. 23 shows the formation of aryllithium intermediates through the reaction of the aryl halide 1a and n-BuLi in R1, and the reaction of the aryllithium intermediates formed in R1 with MeOH in R2.

First, the successful control of short-lived intermediates at various temperatures was experimentally verified by reacting three types of aryllithium with methanol using capillary. FIG. 23 shows the formation of aryllithium intermediates through the reaction of the aryl halide 1a and n-BuLi in R1, and the reaction of the aryllithium intermediates formed in R1 with MeOH in R2. The reaction was carried out at room temperature. The difference in flow rates between 1a and n-BuLi significantly affects the production yield of product 2a. As confirmed in FIG. 23, the o-lythiophenyl isothiocyanate 1a' produced from the aryl halide 1a and n-BuLi in R1 (4 cm long) produced product 2a in a high yield of 93% at 25° C., a flow rate of 7.5 mL and an optimal residence time (about 16 ms).

Yields were determined by GC unless otherwise specified.

In addition, p-lithiobenzonitrile 1b' and m-lithionitrobenzene 1c' formed from 1b and 1c provided the protonated products 2e and 2i in the same yield of 87% at optimum temperatures of 0° C. and −28° C., respectively.

For the equivalent performance verification of single-type 4N-PMR, the same chemical reaction was performed by using the reagents supplied to 4N-PMR at a flow rate 4 times higher under the same conditions as those applied to SMR. Both SMR and 4N-PMR showed only about 2% difference in yield as shown in FIG. 22, demonstrating the same reaction efficiency.

In addition, aryllithium intermediate 1a' was reacted with phenyl isocyanate to produce the biologically active thioquinazolinone ring compound 2b in yields of 86% in SMR and 85% in 4N-PMR. In the same manner, aryllithium 1b' and 1c' were reacted with iodomethane and methyl triflate to produce the methylated product 2f in yields of 90% in SMR and 89% in 4-PMR, respectively, and they produced the methylated product 2j in yields of 86% in SMR and 84% in 4-PMR. The three lithiated intermediates were reacted with tributyltin chloride to produce organotin products 2c, 2g and 2k in similar yields within 3% difference in both SMR and 4-PMR. For the 2j and 2k syntheses, the residence time of R2 was four times longer to reach the highest yield. This may be due to the lower reactivity of the reagents at lower temperatures for the control of aryllithium intermediates including nitro groups.

Figure 24:
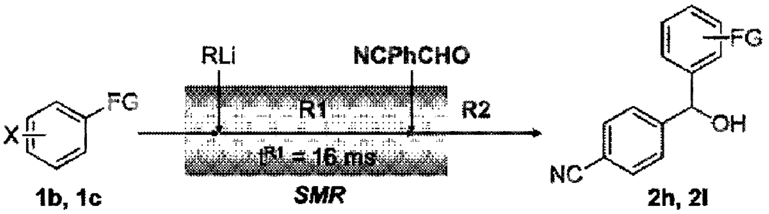
FIG. 24 shows the optimization of the residence time at R2 for the reaction of the aryllithium intermediate with 4-formylbenzonitrile in SMR.
Figure 24:
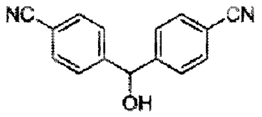
Figure 24:
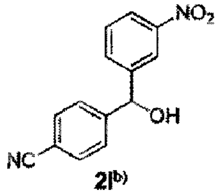

In addition, the three aryllithium intermediates were reacted with 4-formylbenzonitrile, which is a pharmacophore having an aromatase inhibitory effect, to obtain the corresponding products 2d and 2h (letrozole precursors for breast cancer) and product 2l in very excellent yields. FIG. 24 shows the optimization of the residence time at R2 for the reaction of the aryllithium intermediate with 4-formylbenzonitrile in SMR. In contrast to the other reactions described above, where the yield was significantly reduced to about 50% at longer reaction times (2.2 s, 9 s) as confirmed in FIG. 24, it is worth noting that the excellent yields (98%, 96%) of 2h and 2l were achieved in shorter reaction times (0.56 s, 2.24 s) in R2. This is presumably due to the decomposition of the lithium methoxide intermediate of R2 without intramolecular cyclization.

The yield difference between SMR and 4N-PMR was confirmed to be within 3% for all entries, which is presumed to be the result of uniformly distributed reagent solutions through the three inlets. Therefore, it was successfully confirmed that the 4N-PMR system increases the productivity of the drug scaffold by 4 times through a two-step ultrafast subsecond chemical reaction without yield loss in the 4N-PMR system.

In FIG. 24, [a)] represents the value measured by $^{1}H$ NMR spectroscopy using 1,3,5-trimethoxybenzene as an internal standard. In FIG. 24, [b)] represents the yield determined by GC.

The specific methods for synthesizing the generated compounds 2a to 21 are as follows.

Figure 25:
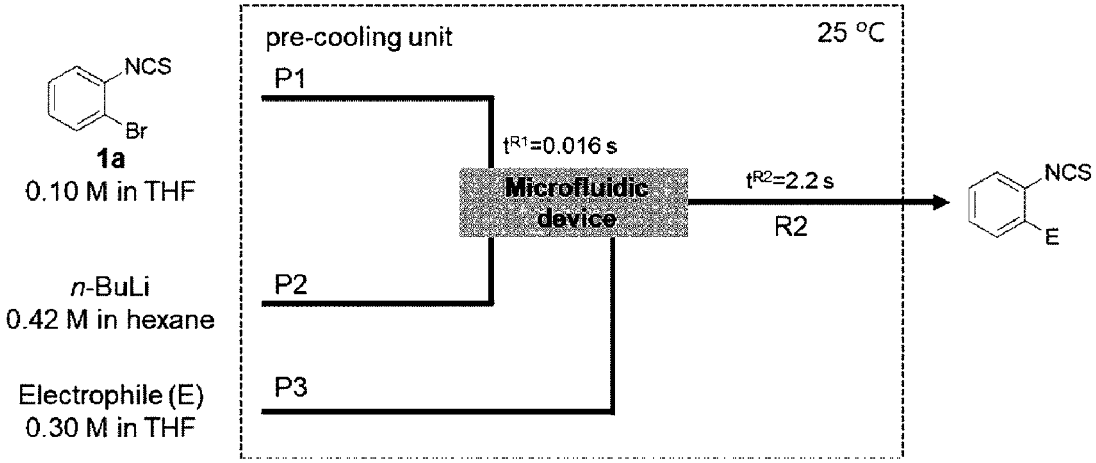
FIG. 25 shows the general procedure for reaction with electrophiles in microfluidic systems after Br—Li exchange reaction of 2-bromophenyl isothiocyanate.

The general procedure for reaction with electrophiles in microfluidic systems after Br—Li exchange reaction of 2-bromophenyl isothiocyanate is shown in FIG. 25.

SMR: The procedure described in the literature [H. Kim, H. J. Lee, D. P. Kim, *Angew. Chemie—Int. Ed.* 2015, 54, 1877-1880] was used with slight modifications. A microfluidic system composed of two T-shaped micromixers (M1 and M2), two microtube reactors (R1 and R2) and three tube precoolers (P1, P2, P3 (inner diameter Ø=1,000 μm, length L=50 cm)) was used. A 0.10 M solution of 2-bromophenyl isothiocyanate dissolved in THF (flow rate: 6.0 mL $min^{-1}$) and a 0.42 M solution of n-BuLi dissolved in hexane (flow rate: 1.5 mL $min^{-1}$) were introduced into M1 by a syringe pump (Ø=500 μm). The resulting solution was passed through R1 (Ø=250 μm, L=4.0 cm) and mixed with a 0.30M solution of an electrophile dissolved in THF of M2 (Ø=500 μm) (flow rate: 3.0 mL $min^{-1}$). The resulting solution was passed through R2 (Ø=1,000 m, L=50 cm).

4N-PMR: A microfluidic system composed of three tube pre-temperature maintenance units (P1, P2, P3 (inner diameter Ø=1,000 μm, length L=50 cm)), a microtube reactor (R2) and 4N-PMR was used. A 0.10 M solution of 2-bromophenyl isothiocyanate dissolved in THF (flow rate: 24.0 mL $min^{-1}$), a 0.42 M solution of n-BuLi dissolved in hexane (flow rate: 6.0 mL $min^{-1}$) and a 0.30 M solution of an electrophile dissolved in THF (flow rate: 12.0 mL $min^{-1}$) were introduced into 4N-PMR by a syringe pump. The resulting solution was passed through R2 (Ø=1,000 μm, L=200 cm).

After steady state was reached, the product solution was quenched with saturated aqueous $NH_4Cl$ solution while collecting for 30 seconds. The reaction mixture was analyzed by GC. The organic phase was separated, and the aqueous phase was extracted with acetone. The combined organic phases were dried over $Na_2SO_4$, and the solvent was removed. The isolated yield was calculated by recrystallization with n-hexane. The product was analyzed by $^{1}H$ and $^{13}C$ NMR and GCMS.

[Compound 2a]

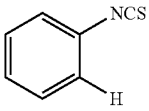

Phenyl isothiocyanate (2a): When 2-bromophenyl isothiocyanate and methanol were used in the reaction, the products were obtained in yields of 93% in SMR and 92% in 4N-PMR (GC $t^R$ 6.8 min). The crude products were extracted and purified by silica gel chromatography (hexane/AcOEt=20/1): $^{1}H$ NMR (500 MHz, $CDCl_3$) δ 7.38 (t, J=7.6 Hz, 2H), 7.30 (t, J=8.8 Hz, 1H), 7.25 ppm (d, J=6.0 Hz, 2H); $^{13}C$ NMR (500 MHz, $CDCl_3$) δ 135.6, 131.5, 129.8, 127.5, 126.0 ppm.

[Compound 2b]

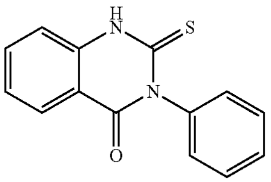

3-Phenyl-2-thioxo-2,3-dihydroquinazolin-4(1H)-one (2b): The crude products from 2-bromophenyl isothiocyanate and phenyl isocyanate were extracted, recrystallized with hexane and purified to obtain yields of 86% in SMR and 85% in 4N-PMR yield as isolated yields: $^{1}H$ NMR (500 MHz, DMSO-d6) δ 13.06 (s, 1H), 7.95 (dd, J=4.6 Hz, 1H), 7.80-7.76 (m, 1H), 7.49-7.33 (m, 5H), 7.28-7.27 ppm (m, 2H); 13C NMR (500 MHz, DMSO-d6) δ 176.0, 159.8, 139.6, 139.3, 135.6, 129.0, 128.9, 128.1, 127.4, 124.3, 116.2, 115.7 ppm.

[Compound 2c]

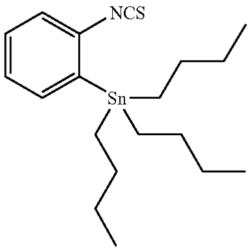

Tributyl(2-isothiocyanatophenyl)stannane (2c): When 2-bromophenyl isothiocyanate and tributyltin chloride were used in the reaction, the products were obtained in yields of 95% in SMR and 98% in 4N-PMR (GC $t^R$ 13.0 min). The crude products were extracted and purified by silica gel chromatography (hexane/AcOEt=20/1): $^{1}H$ NMR (500 MHz, DMSO-d6) δ 7.51-7.46 (m, 2H), 7.43-7.39 (m, 1H), 7.36-7.33 (m, 1H), 1.57-1.45 (m, 6H), 1.29 (sex, J=18.3 Hz, 6H), 1.19-1.09 (m, 6H), 0.85 ppm (t, J=7.3 Hz, 9H); $^{13}C$ NMR (500 MHz, DMSO-d6) δ 138.2, 137.1, 136.5, 130.0, 127.5, 126.8, 28.5, 26.6, 13.5, 9.6 ppm.

[Compound 2d]

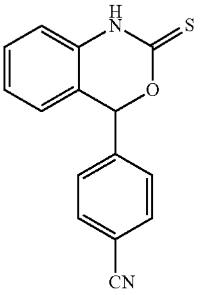

4-(4-Cyanophenyl)-1H-benzo[d][1,3]oxazin-2(4H)-thione (2d): When 2-bromophenyl isothiocyanate and 4-formylbenzonitrile were used in the reaction, the products was obtained in yields of 88% in SMR and 91% in 4N-PMR (GC $t^R$ 15.0 min). The crude products were extracted and purified by silica gel chromatography (hexane/AcOEt=4/1): $^1$H NMR (500 MHz, DMSO-d6) δ 12.23 (s, 1H), 7.93 (d, J=4.2 Hz, 2H), 7.54 (d, J=4.1 Hz, 2H), 7.39 (td, J=8.3 Hz, 1H), 7.16 (td, J=7.6 Hz, 1H), 7.11 (d, J=4.0 Hz, 1H), 7.06 (d, J=3.8 Hz, 1H), 6.79 ppm (s, 1H); $^{13}$C NMR (500 MHz, DMSO-d6) δ 182.9, 143.0, 132.8, 129.8, 128.0, 125.7, 124.7, 120.4, 118.4, 114.4, 111.7, 79.2 ppm.

Figure 26:
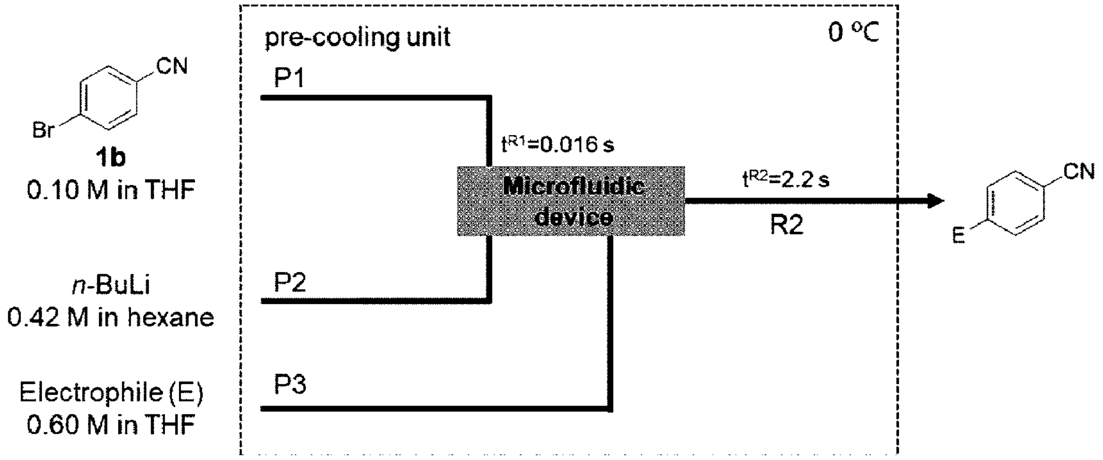
FIG. 26 shows the general procedure for reaction with electrophiles in microfluidic system after Br—Li exchange reaction of 4-bromobenzonitrile.

The general procedure for reaction with electrophiles in microfluidic system after Br—Li exchange reaction of 4-bromobenzonitrile is shown in FIG. 26.

SMR: The procedure described in the literature [A. Nagaki, H. Kim, H. Usutani, C. Matsuo, J. I. Yoshida, *Org. Biomol. Chem.* 2010, 8, 1212-1217] was used with slight modifications. A microfluidic system composed of 2 T-shaped micromixers (M1 and M2), 2 microtube reactors (R1 and R2) and 3 tube pre-cooling units (P1, P2, P3 (inner diameter Ø=1,000 μm, length L=50 cm)) was used. A 0.10 M solution of 2-bromobenzonitrile dissolved in THF (flow rate: 6.0 mL min$^{-1}$) and a 0.42 M solution of n-BuLi dissolved in hexane (flow rate: 1.5 mL min$^{-1}$) were introduced into M1 (Ø=500 μm) by a syringe pump. The resulting solution was passed through R1 (Ø=250 μm, L=4.0 cm) and mixed with a 0.60M solution of an electrophile dissolved in THF of M2 (Ø=500 μm) (flow rate: 3.0 mL min$^{-1}$). The resulting solution was passed through R2 (Ø=1,000 μm, L=50 cm unless otherwise stated).

4N-PMR: A microfluidic system composed of three tube pre-temperature maintenance units (P1, P2, P3 (inner diameter Ø=1,000 μm, length L=50 cm)), a microtube reactor (R2) and 4N-PMR was used. A 0.10 M solution of 2-bromobenzonitrile dissolved in THF (flow rate: 24.0 mL min$^{-1}$, a 0.42 M solution of n-BuLi dissolved in hexane (flow rate: 6.0 mL min$^{-1}$) and a 0.60 M solution of an electrophile dissolved in THF (flow rate: 12.0 mL min$^{-1}$) were introduced into 4N-PMR by a syringe pump. The resulting solution was passed through R2 (0=1,000 m, L=200 cm unless otherwise stated).

After steady state was reached, the product solution was collected for 30 seconds while quenching with $H_2O$ (or 1M aqueous HCl solution if 4-formylbenzonitrile was used as the electrophile). The reaction mixture was analyzed by GC. The organic phase was separated, and the aqueous phase was extracted with ethyl acetate. The combined organic phases were dried over $Na_2SO_4$, and the solvent was removed. The product was analyzed by $^1$H and $^{13}$C NMR and GCMS.

[Compound 2e]

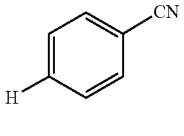

Benzonitrile (2e): When 4-bromobenzonitrile and methanol were used in the reaction, the products were obtained in 87% yield in SMR and 85% yield in 4N-PMR (GC tR 5.0 min). The crude products were extracted and purified by silica gel chromatography (hexane/AcOEt=20/1): $^1$H NMR (500 MHz, $CDCl_3$) δ 7.64 (d, J=4.8 Hz, 2H), 7.59 (t, J=8.9 Hz, 1H), 7.46 ppm (t, J=7.8 Hz, 2H); $^{13}$C NMR (500 MHz, $CDCl_3$) δ 133.0, 132.4, 129.3, 119.0, 112.7 ppm.

[Compound 2f]

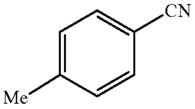

4-Methylbenzonitrile (2f): When 4-bromobenzonitrile and iodomethane were used in the reaction, the products were obtained in 90% yield in SMR and 89% yield in 4N-PMR (GC $t^R$ 6.1 min). The crude products were extracted and purified by silica gel chromatography (hexane/AcOEt=4/1): $^1$H NMR (500 MHz, $CDCl_3$) δ 7.57 (d, J=4.1 Hz, 2H), 7.30 (d, J=3.9 Hz, 2H), 2.45 ppm (s, 3H); $^{13}$C NMR (500 MHz, $CDCl_3$) δ 143.9, 132.3, 130.0, 119.3, 109.6, 22.0 ppm.

[Compound 2g]

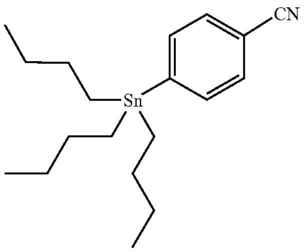

4-Tributylstannylbenzonitrile (2g): When 4-bromobenzonitrile and tributyltin chloride were used in the reaction, the products were obtained in 93% yield in SMR and 90% yield in 4N-PMR (GC $t^R$ 12.7 min). The crude products were extracted and purified by silica gel chromatography (hexane/AcOEt=20/1): $^1$H NMR (500 MHz, $CDCl_3$) δ 7.59-7.50 (m, 4H), δ 1.56-1.45 (m, 6H), δ 1.30 (sex, J=18.4 Hz, 6H), δ 1.14-1.02 (m, 6H), δ 0.87 ppm (t, J=7.3 Hz, 9H); $^{13}$C NMR (500 MHz, $CDCl_3$) δ 150.6, 137.1, 130.9, 119.4, 111.8, 29.2, 27.5, 13.8, 10.0 ppm.

[Compound 2h]

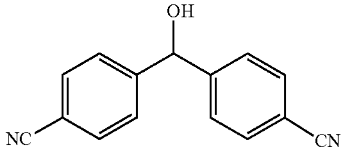

Bis-(4-cyanophenyl)methanol (2h): When 4-bromobenzonitrile and 4-formylbenzonitrile were used in the reaction, the products were obtained in 98% yield in SMR and 97% yield in 4N-PMR. The $^1$H NMR yield of 2f was determined based on the relative intensities of the peaks at 5.89 ppm (1H in 2f) and 6.01 ppm (3H in 1,3,5-trimethoxybenzene). R2 with different lengths (Ø=1,000 μm, L=12.5 cm for SMR, L=50 cm for 4N-PMR) was used for this reaction. The crude products were extracted and purified by silica gel chromatography (hexane/AcOEt=4/1): $^1$H NMR (500 MHz, $CDCl_3$) δ 7.62-7.60 (m, 4H), 7.46 (d, J=4.1 Hz, 4H), 5.89 (s, 1H), 2.65 ppm (br s, 1H); $^{13}$C NMR (500 MHz, $CDCl_3$) δ 147.8, 132.8, 127.3, 118.6, 112.3, 75.1 ppm.

Figure 27:
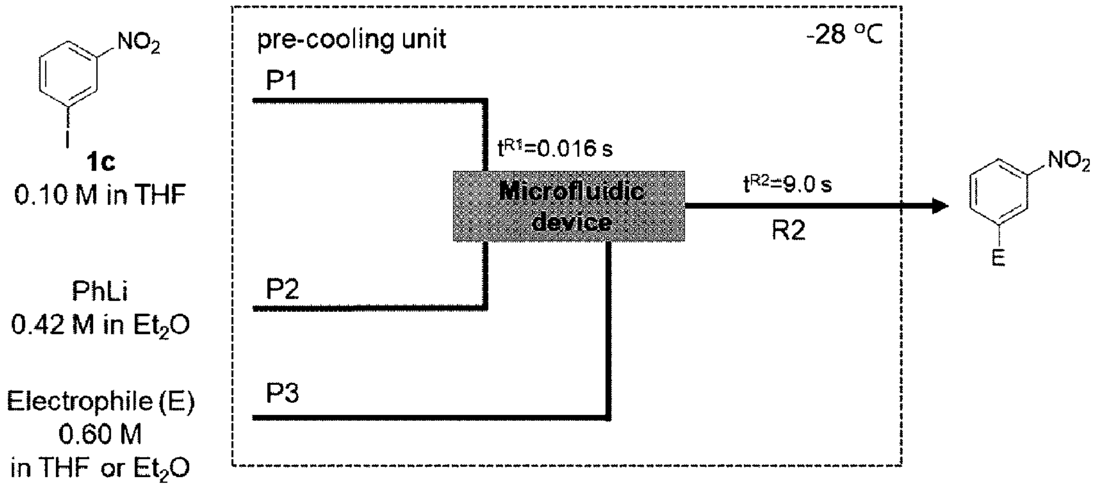
FIG. 27 shows the general procedure for reaction with electrophiles in microfluidic system after I—Li exchange reaction of 1-iodo-3-nitrobenzene.

The general procedure for reaction with electrophiles in microfluidic system after I—Li exchange reaction of 1-iodo-3-nitrobenzene is shown in FIG. 27.

SMR: The procedure described in the literature [A. Nagaki, H. Kim, J. ichi Yoshida, *Angew. Chemie—Int. Ed.* 2009, 48, 8063-8065] was used with slight modifications. A microfluidic system composed of 2 T-shaped micromixers (M1 and M2), 2 microtube reactors (R1 and R2) and 3 tube pre-cooling devices (P1, P2, P3 (inner diameter Ø=1,000 μm, length L=50 cm)) was used. A 0.10 M solution of 1-iodo-3-nitrobenzene dissolved in THF (flow rate: 6.0 mL $min^{-1}$) and a 0.42 M solution of PhLi dissolved in $Et_2O$ (flow rate: 1.5 mL $min^{-1}$) were introduced into M1 (Ø=500 m) by a syringe pump. The resulting solution was passed through R1 (Ø=250 μm, L=4.0 cm) and mixed with a 0.60M solution of an electrophile dissolved in THF (or $Et_2O$ for MeOTf) of M2 (Ø=500 μm) (flow rate: 3.0 mL $min^{-1}$). The resulting solution was passed through R2 (Ø=1,000 μm, L=200 cm).

4N-PMR: A microfluidic system composed of 3 tube pre-temperature maintenance units (P1, P2, P3 (inner diameter Ø=1,000 μm, length L=50 cm)), a microtube reactor (R2) and 4N-PMR was used. A 0.10 M solution of 1-iodo-3-nitrobenzene dissolved in THF (flow rate: 24.0 mL $min^{-1}$), a 0.42 M solution of PhLi dissolved in $Et_2O$ (flow rate: 6.0 mL $min^{-1}$) and a 0.60 M solution of an electrophile dissolved in THF (flow rate: 12.0 mL $min^{-1}$) were introduced into 4N-PMR by a syringe pump. The resulting solution was passed through R2 (Ø=1,000 μm, L=800 cm).

After steady state was reached, the product solution was collected for 30 seconds while quenching with $H_2O$. The reaction mixture was analyzed by GC. The organic phase was separated, and the aqueous phase was extracted with ethyl acetate. The combined organic phases were dried over $Na_2SO_4$, and the solvent was removed. The product was analyzed by $^1H$ and $^{13}C$ NMR and GCMS.

[Compound 2i]

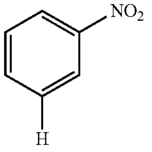

Nitrobenzene (2i): When 1-iodo-3-nitrobenzene and methanol were used in the reaction, the products were obtained in 87% yield in SMR and 88% yield in 4N-PMR (GC $t^R$ 6.0 min). The crude products were extracted and purified by silica gel chromatography (hexane/AcOEt=20/1): $^1H$ NMR (500 MHz, $CDCl_3$) δ 8.22 (d, J=4.3 Hz, 2H), 7.68 (t, J=8.6 Hz, 1H), 7.53 (t, J=8.1 Hz, 2H); $^{13}C$ NMR (500 MHz, $CDCl_3$) δ 148.5, 134.8, 129.5, 123.7 ppm.

[Compound 2j]

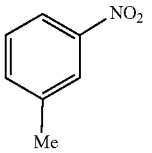

3-Nitrotoluene (2j): When 1-iodo-3-nitrobenzene and methyl triflate were used in the reaction, the products were obtained in 86% yield in SMR and 84% yield in 4N-PMR (GC $t^R$ 6.9 min). The crude products were extracted and purified by silica gel chromatography (hexane/AcOEt=4/1): $^1H$ NMR (500 MHz, $CDCl_3$) δ 8.01 (d, J=5.7 Hz, 2H), 7.48 (d, J=3.8 Hz, 1H), 7.40 (t, J=7.8 Hz, 1H), 2.45 ppm (s, 3H); $^{13}C$ NMR (500 MHz, $CDCl_3$) δ 148.5, 140.0, 135.5, 129.3, 124.1, 120.9, 21.4 ppm.

[Compound 2k]

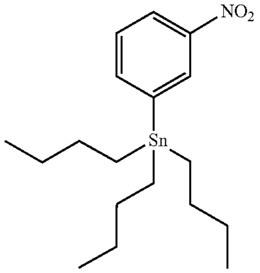

Tributyl(3-nitrophenyl)stannane (2k): When 1-iodo-3-nitrobenzene and tributyltin chloride were used in the reaction, the products were obtained in 97% yield in SMR and 99% yield in 4N-PMR (GC $t^R$ 13.1 min). The crude products were extracted and purified by silica gel chromatography (hexane/AcOEt=20/1): $^1H$ NMR (500 MHz, $CDCl_3$) δ 8.31-8.23 (m, 1H), 8.12-8.09 (m, 1H), 7.77-7.71 (m, 1H), 7.47-7.44 (m, 1H), 1.54-1.50 (m, 6H), 1.32 (sex, J=18.4 Hz, 6H), 1.16-1.04 (m, 6H), 0.87 ppm (t, J=7.3 Hz, 9H); $^{13}C$ NMR (500 MHz, $CDCl_3$) δ 145.2, 142.7, 130.7, 128.7, 123.2, 29.2, 27.5, 13.8, 10.1 ppm.

[Compound 2l]

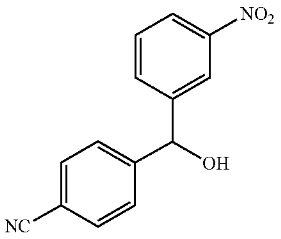

4-(Hydroxy(3-nitrophenyl)methyl)benzonitrile (2l): When 1-iodo-3-nitrobenzene and 4-formylbenzonitrile were used in the reaction, the products were obtained in 73% yield in SMR and 76% yield in 4N-PMR yield (GC $t^R$ 14.1 min). The crude products were extracted and purified by silica gel chromatography (hexane/AcOEt=4/1): $^1H$ NMR (500 MHz, $CDCl_3$) δ 8.24 (s, 1H), 8.13 (d, J=4.8 Hz, 1H), 7.65-7.49 (m, 6H), 5.96 (s, 1H), 2.64 ppm (br s, 1H); $^{13}C$ NMR (500 MHz, $CDCl_3$) δ 148.7, 147.8, 144.9, 132.9, 130.0, 127.3, 123.3, 121.6, 112.3, 74.9 ppm.

Example 5

Manufacture of 16 Numbering-Up Printed Metal Microreactors (16N-PMR)

Figure 9A:
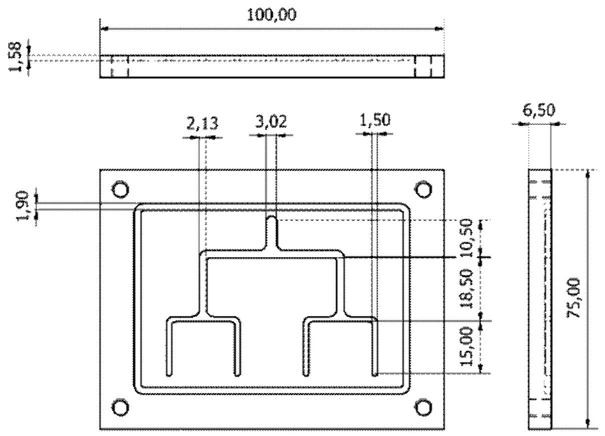
Figure 9B:
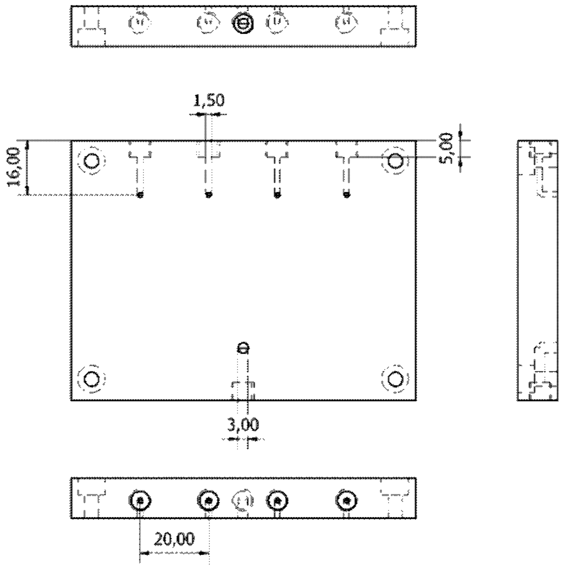
Figure 9C:
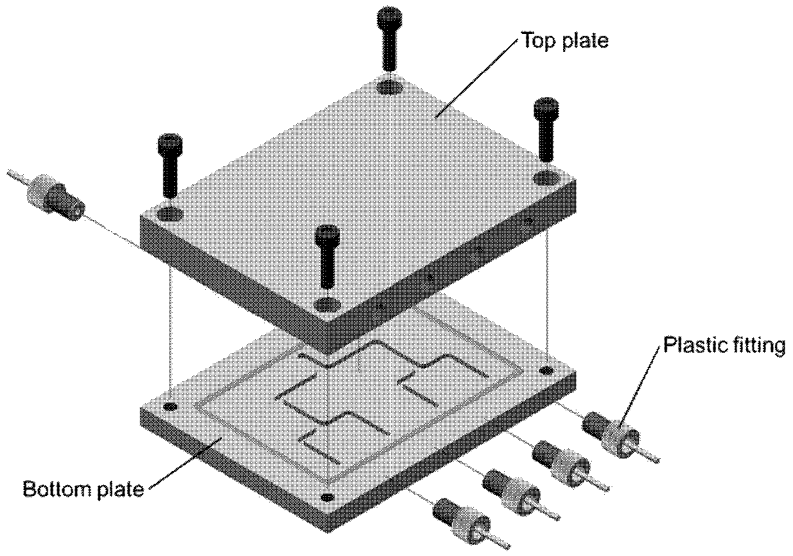

A 16 numbering-up printed metal microreactor (16N-PMR) assembly composed of 4 stacked modules of 4N-PMR and 4 units of external flow distributors (EFD) connecting the same with plastic fittings and ⅛" tubing was additionally designed to access industrial level productivity (FIGS. 8A and 8B). The three stainless steel EFDs were designed to uniformly inject the injection solution into each 4N-PMR according to the commonly known geometric proportions of the branched distributor. Another EFD with the same pattern was utilized as a collection outlet. The EFD device was manufactured by CNC machining. The EFD was also assembled by joining the patterned top and bottom plates with CNC (computerized numerical control) machining (FIGS. 9A, 9B and 9C).

Specifically, the 16N-PMR is composed of four 4N-PMRs paralleled through four external flow distributors. The external flow distributor was manufactured by dividing the upper and lower plates, machining the same by CNC machining and then combining the same. CNC machining of the SUS316L material was performed by using a CTX Beta 1250 TC machine from DMG MORI. A fluorine-based polymer O-ring was disposed between the upper plate and the lower plate and assembled without leakage. Finally, the four manufactured distributors were connected to four 4N-PMRs with plastic fittings and ⅛" tubing to form a 16N-PMR (one distributor was used as a junction for product collection).

Example 6

Flow Distribution Performance of Single External Flow Distributor (EFD) Unit

Figure 10A:
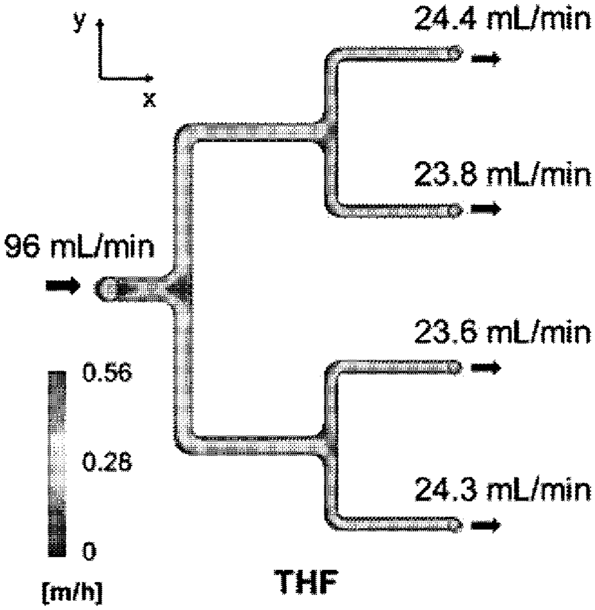
FIGS. 10A, 10B and 10C show simulated flow distribution behavior of individual EFDs in an individual and independent manner at each fluidic condition.
Figure 10B:
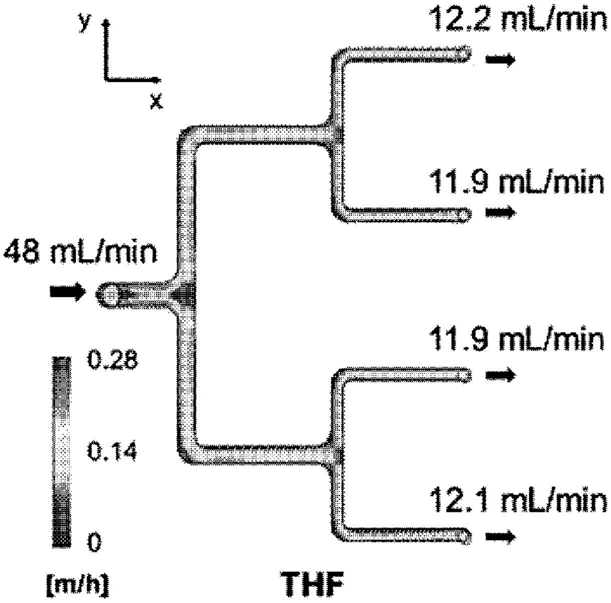
Figure 10C:
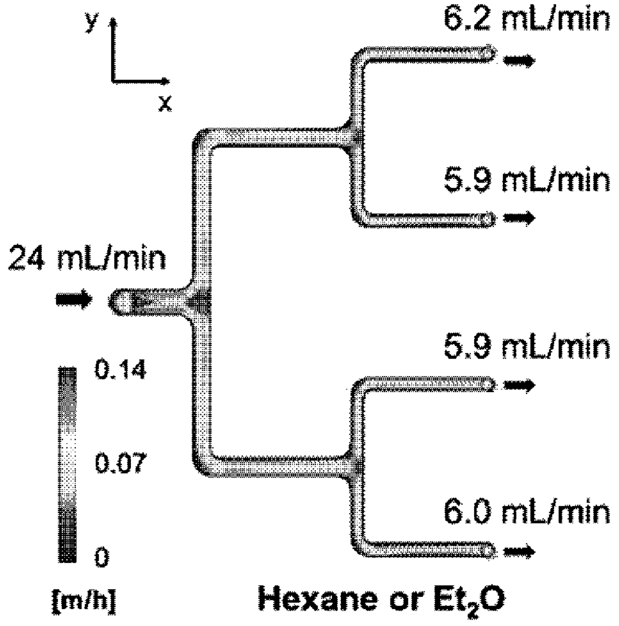

In the same manner as in Example 2, the internal flow distribution performance of the EFD unit and the entire system designed through the CFD simulation and experiments was investigated. For scale-up production, the fluid conditions for a specific EFD unit (THF 96 mL $min^{-1}$, hexane 24 mL $min^{-1}$, THF 48 mL $min^{-1}$) were set to be the same as the actual reaction conditions applied to 16N-PMR. Table 1 shows the comparison of numerical and experimental maldistribution factors (MF) in an external flow distributor (EFD) and 16N-PMR assembly. Initially, the numerical MF values of the three EFD inlet devices were individually calculated to within 2.20% at the outlet (Entries 1 to 3 in Table 1 and FIGS. 10A, 10B and 10C), but the experimental MF values in the range of 1.12%-3.45% were obtained by measuring the volume of fluid collected at the four outlets of each EFD unit (Entries 1 to 3 in Table 1 and FIG. 11B).

TABLE 1

| Entry | Device | Total flow rate [mL/min] | Numerical MF [%] | Experimental MF [%] |
|---|---|---|---|---|
| 1 | EFD1 | 96 | 1.73 | 1.12 |
| 2 | EFD2 | 24 | 2.20 | 3.45 |
| 3 | EFD3 | 48 | 1.40 | 2.72 |
| 4 | 16N-PMR | 168 | 1.66 | 1.04 |

Example 7

Computational Fluid Dynamics (CFD) Simulation of 16N-PMR Assembly

A numerical computational fluid dynamics (CFD) study was performed as in Example 2 to evaluate the pressure drop, distribution performance and mixing efficiency of the 3D model corresponding to 16N-PMR.

Figure 12A:
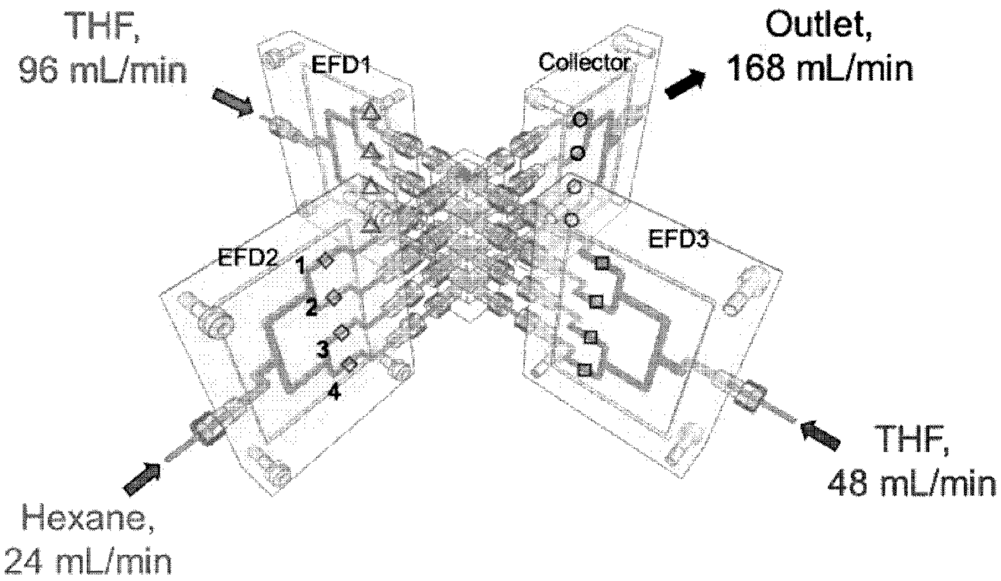
Figure 12B:
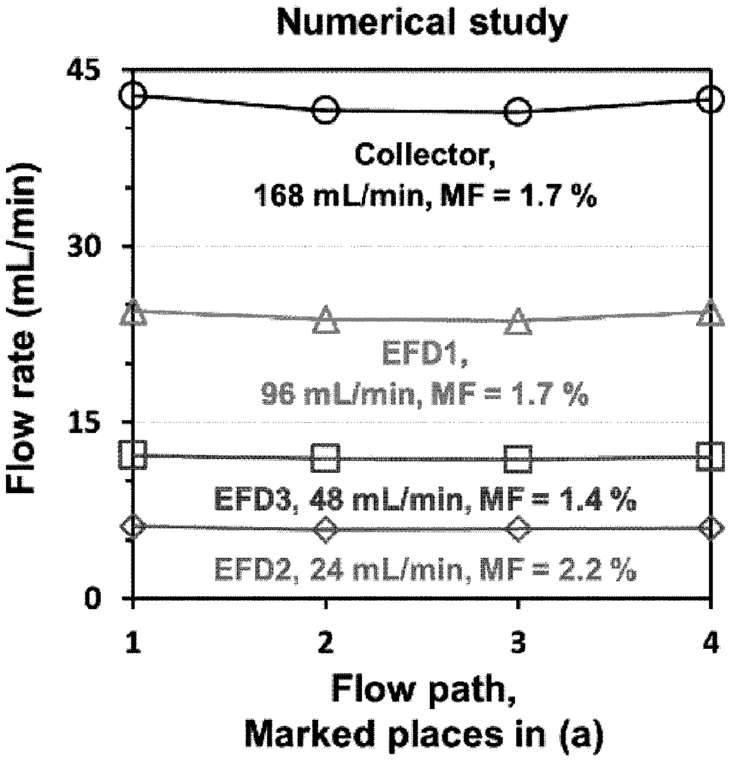
Figure 13A:
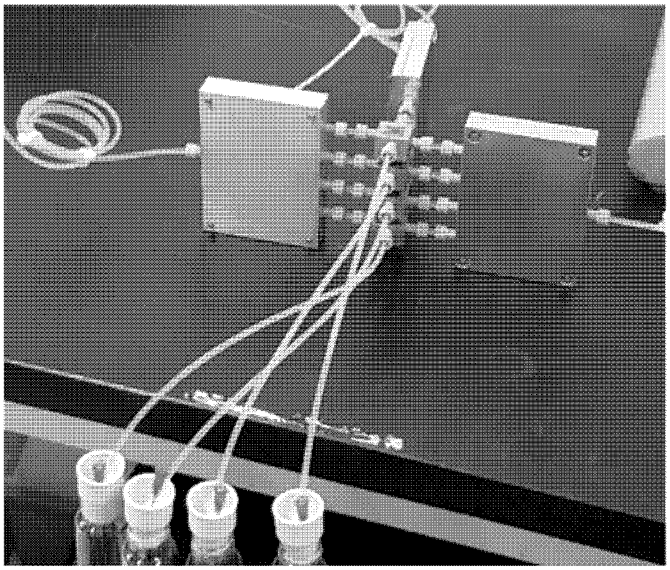
FIG. 13A is an image showing the experimental setup.
Figure 13B:
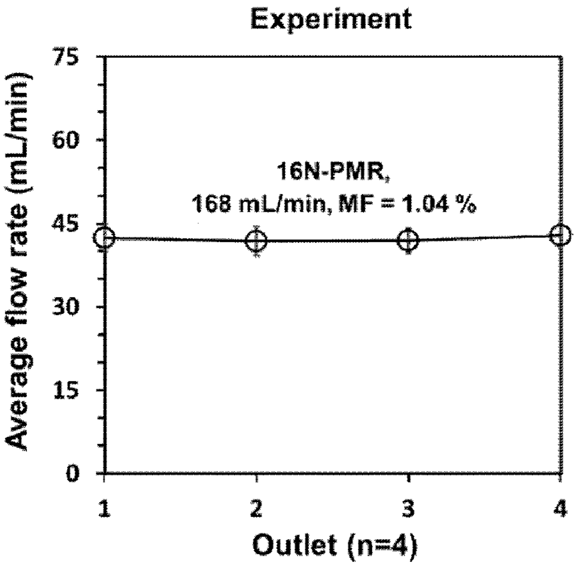
FIG. 13B shows the experimental MF values of a modular 16N-PMR assembly obtained by measuring the volumes of liquids collected at 4 outlets without a collecting EFD unit with a total flow rate of 168 mL $min^{-1}$ (supplied to each EFD unit at 96 mL $min^{-1}$ of THF, 24 mL $min^{-1}$ of hexane, and 48 mL $min^{-1}$ of THF).

CFD simulation of the modular 16N-PMR assembly was performed to obtain numerical MF values at the flow rate of the connecting part from the end of the built-in EFD to the inlet of the 4N-PMR. FIG. 12B shows that the calculated MF values fell within the range of 1.40% to 2.20% when fluids were individually injected into the three EFDs, as assumed. The MF of the collected outlet also showed 1.66% at a total flow rate of 168 mL $min^{-1}$, which was higher than 0.2% of the built-in 4N-PMR. A 3D-printed 4N-PMR integrated body with microscopic internal structures likely had a more uniform flow distribution function than a 16N-PMR module manually assembled with piping. As confirmed in Entry 4 of Table 1 and FIG. 13B, the MF value of the total 16N-PMR was determined to be 1.04% by measuring the liquid volume collected at all four outlets. Both the experimental and numerical MF values of 16N-PMR were significantly lower than 5%, which is generally acceptable for chemical synthesis in a numbering-up system. A modular 16N-PMR assembly composed of four 4N-PMRs can promote heat dissipation with some spacing between the 4N-PMR arrays.

In order to validate the scalability of this reaction system, the pressure drop as a function of flow rate was simulated numerically for the numbering-up microfluidic reactors of both 4N-PMR and 16N-PMR by using a pressure gradient across the entire flow path in 16N-PMR.

Figure 14:
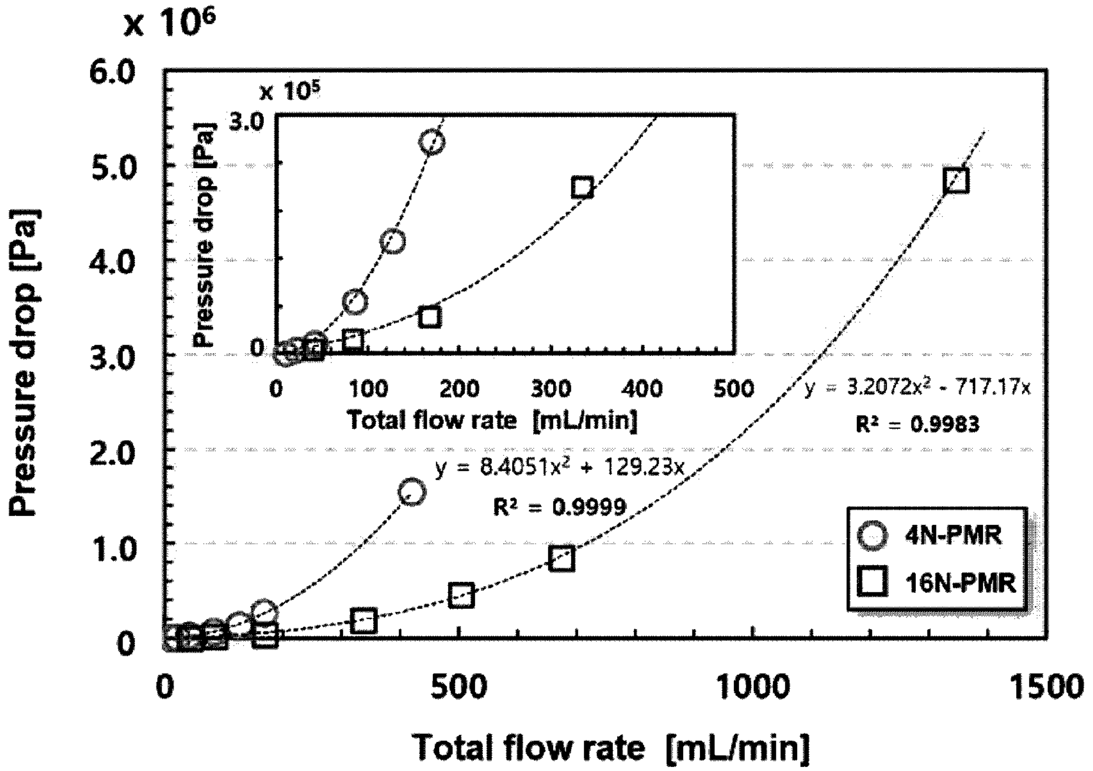
FIG. 14 shows the pressure drop as a function of flow rate for 4 numbering-up printed microfluidic reactors (4N-PMR) and 16N-PMR, which is an assembly thereof, obtained by the computational fluid dynamics (CFD) simulation.

Through FIG. 14, it is possible to predict the pressure drop induced to the numbering-up microfluidic reactors of the 4N-PMR and 16N-PMR in a specific flow rate range, and the pressure drop may be actually utilized to implement and manufacture the numbering-up microfluidic reactors. The simulation results of FIG. 14 show that the pressure drop exponentially increases with the flow rate increase in both of the 4N-PMR and 16N-PMR. This suggests that a significant pressure drop may be induced when a short residence time ($t^{R1}$) is to be secured by a simple flow rate increase, and accordingly, it can be seen that it is necessary to fabricate a precise reactor structure to secure the residence time ($t^{R1}$) while minimizing the pressure drop.

Figure 15:
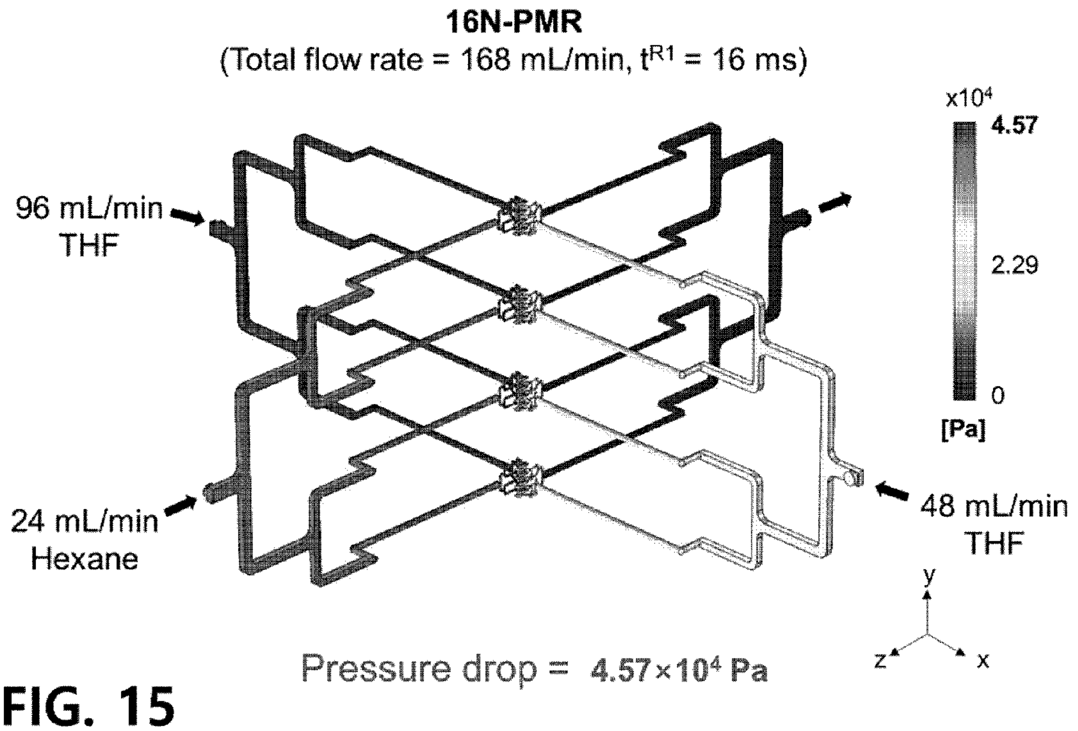
FIG. 15 shows the pressure drop results obtained by the computational fluid dynamics (CFD) simulation for 16N-PMR at a residence time ($t^{R1}$) of 0.016 s.
Figure 16A:
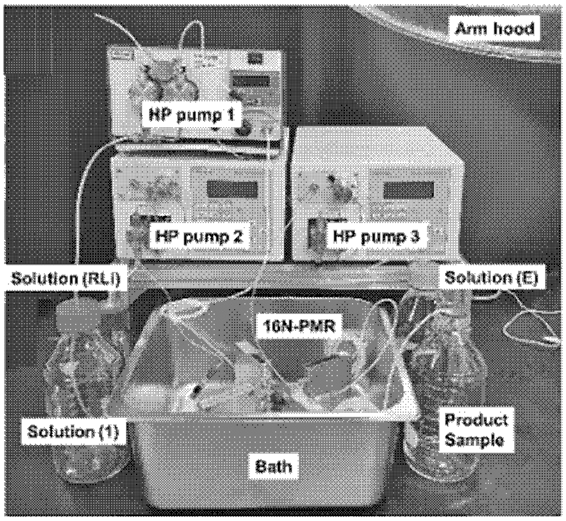
Figure 16B:
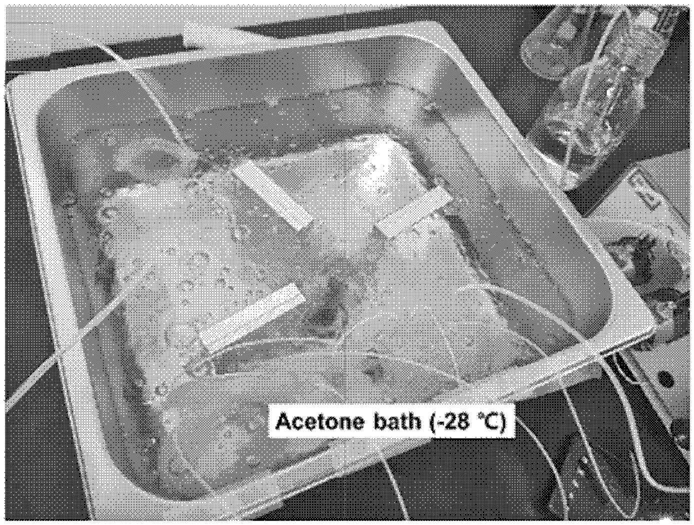
Figure 16C:
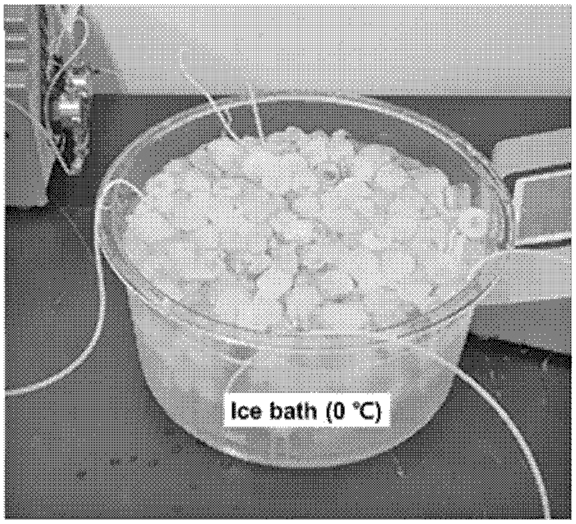

As confirmed in FIG. 15, the pressure drop for 16N-PMR at a residence time ($t^{R1}$) of 0.016 s was $4.57\times10^4$ Pa. It can be seen that even the modular 16N-PMR assembly exhibits an acceptable level of low pressure drop.

Example 8

Figure 28:
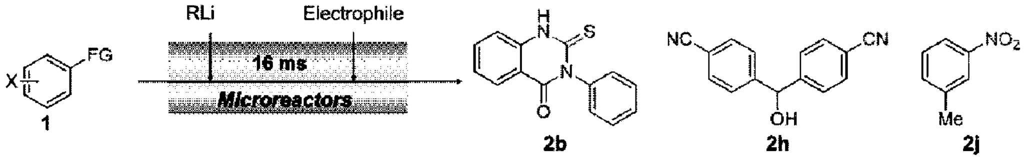
FIG. 28 shows the scale-up production of the three drug scaffolds including a letrozole precursor using the 16-PMR assembly and the comparative synthesis performance of SMR and 4N-PMR.

Ultrafast Flow Synthesis Using Aryllithium Intermediates and Electrophiles for Performance Comparison of 16N-PMR, SMR and 4N-PMR Scalable production of the modular 16N-PMR assembly was carried out under the same conditions as applied for SMR and 4N-PMR. FIG. 28 shows the scale-up production of the three drug scaffolds including a letrozole precursor using the 16-PMR assembly and the comparative synthesis performance of SMR and 4N-PMR. As shown in FIGS. 16A to 16C and 28, the production performance of 16N-PMR was confirmed by comparing the yields obtained from SMR and 4N-PMR. Three reagents were separately injected into the 16N-PMR via three EFDs. Specifically, injection was performed at a flow rate of 96 mL $min^{-1}$ and 24 mL $min^{-1}$ for aryl halide and n-BuLi, respectively, and at a flow rate of 48 mL $min^{-1}$ for the electrophile. This is 16 several times higher compared to SMR. The scaffolds of S-functionalized thioquinazolinone, letrozole and torasemide (2b, 2 h and 2j) were obtained with yields of 81%, 92% and 80%, respectively, with the modular 16N-PMR assembly. The results showed a slight yield loss of about 5% for all three reactions, which is different from a 2% to 3% increase or loss in 4N-PMR performance.

In FIG. 28, $^{a)}$ represents the yield of isolated product. In FIG. 28, $^{b)}$ represents the value measured by $^1H$ NMR spectroscopy using 1,3,5-trimethoxybenzene as an internal standard. In FIG. 28, $^{c)}$ represents the yield determined by GC.

Figure 29:
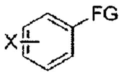
FIG. 29 shows the general procedure for the reaction of functionalized aryl halides with electrophiles in 16N-PMR after halogen-lithium exchange reaction.
Figure 29:
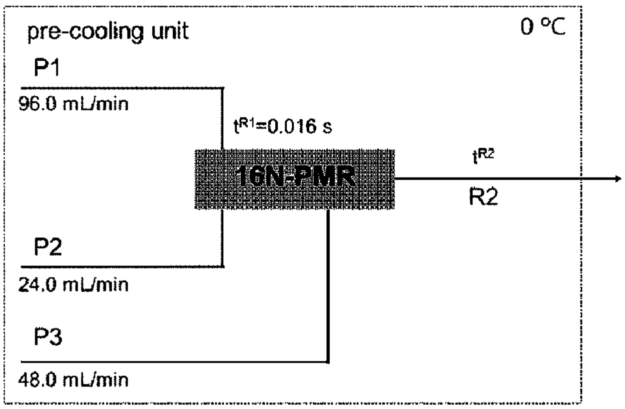
Figure 29:
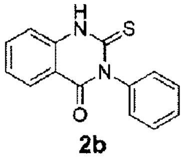
Figure 29:
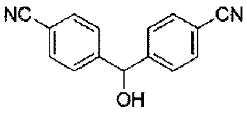
Figure 29:
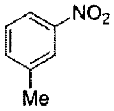

The specific methods for synthesizing the resulting compounds 2b, 2 h and 2j are shown in FIG. 29.

FIG. 29 shows the general procedure for the reaction of functionalized aryl halides with electrophiles in 16N-PMR after halogen-lithium exchange reaction.

16N-PMR: A microfluidic system composed of three tube preliminary temperature maintenance units (P1, P2 and P3 (inner diameter Ø=1,580 μm, length L=110 cm)), 16N-PMR and a microtube reactor (R2) was used. A 0.10 M solution of starting materials (2-bromophenyl isothiocyanate, 4-bromobenzonitrile and 1-iodo-3-nitrobenzene) dissolved in THF (flow rate: 96.0 mL $min^{-1}$) and a 0.42 M solution of n-BuLi dissolved in hexane (or PhLi dissolved in $Et_2O$ if 1-iodo-3-nitrobenzene was used as a starting material (flow rate: 24.0 mL $min^{-1}$)) and a 0.60 M solution of an electrophile dissolved in THF (or $Et_2O$ for MeOTf)) (or a 0.30 M solution if 2-bromophenyl isothiocyanate was used as a starting material) (flow rate: 48.0 mL min-) were introduced into 16N-PMR by a syringe pump. The resulting solution was passed through R2 (Ø=1,580 μm, L=320, 80 and 1,280 cm for each reaction).

After steady state was reached, the product solution was collected for 30 minutes while quenching with saturated aqueous $NH_4Cl$ solution, 1M aqueous HCl solution and $H_2O$ for each reaction. The reaction mixture was analyzed by GC. The organic phase was separated, and the aqueous phase was extracted with ethyl acetate. The combined organic phases were dried over $Na_2SO_4$, and the solvent was removed. The product was analyzed by $^1H$ and $^{13}C$ NMR and GCMS. The isolated yield was calculated by recrystallization with hexane. The $^1H$ NMR yield of 2j was determined based on the relative intensities of the peaks at 5.89 ppm ($^1H$ in 2h) and 6.01 ppm (3H in 1,3,5-trimethoxybenzene).

Figure 11A:
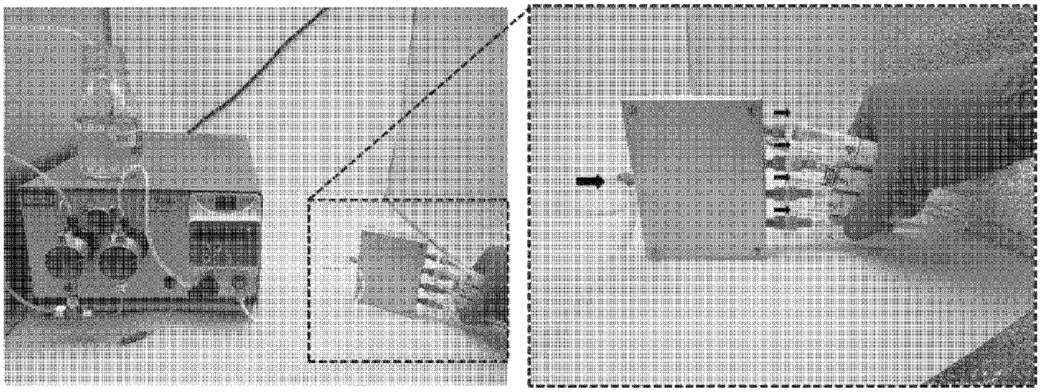
FIG. 11A is an image showing the experimental setup.
Figure 11B:
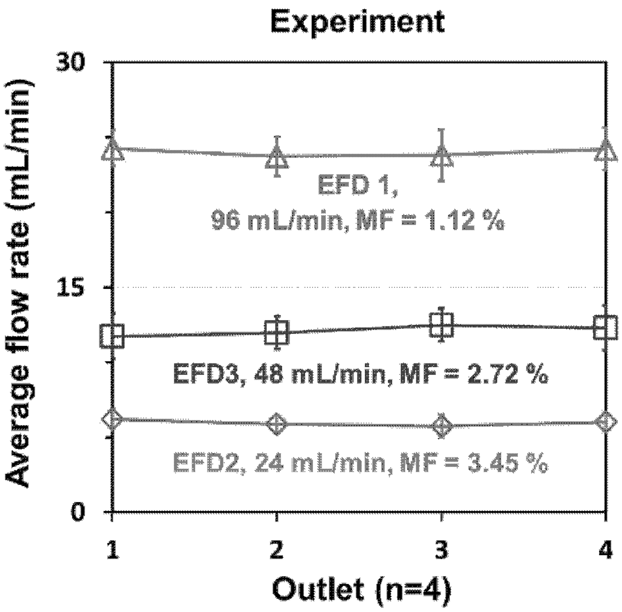
FIG. 11B shows the experimental MF values of 3 inlet EFD units obtained by measuring the volumes of liquids collected at 4 outlets under the conditions of THF at 96 mL $min^{-1}$, THF at 48 mL $min^{-1}$ and hexane at 24 mL $min^{-1}$.

Perhaps ultrafast subsecond synthesis is extremely sensitive to the feed rate of reagents, but both good mixing efficiency and accurate retention time control are critical for achieving high yields. In the present invention, additional experiments were performed on SMR to account for slightly different ratios of reagents in the halogen-lithium exchange reaction taking into account the numerical MF values. As confirmed in FIG. 23, the results indicated that the marginally different flow rates of the two reagents caused significant yield losses due to side reactions with the excessive amounts of organolithium reagents or insufficient lithiation. It should be pointed out that the low MF values of the 16N-PMR assembly, within the generally acceptable range for flow chemistry reaction, were poorly acceptable for ultrafast subsecond chemistry reaction. It is further rationalized that the built-in 4N-PMR integrated body with a very low MF (0.2%) provides almost the same yield as the SMR within the experimental error range, which is much lower than the simulated values (FIG. 11B). Eventually, the liter scale reaction mixture operating for 10 minutes was collected and succeeded in increasing the output by a factor of 16 times at optimal conditions. Actual separation of 10 to 20 g of a drug scaffold can produce up to about 3 kg/day in a small 16N-PMR system. Therefore, multiple sets of this assembly system using the 3D metal printing method may be easily set up to meet various scales of drug scaffolds for the clinical and market needs of the pharmaceutical industry.

Example 9

Computational Fluid Dynamics (CFD) Simulation of Various Microfluidic Reactors

Figure 19:
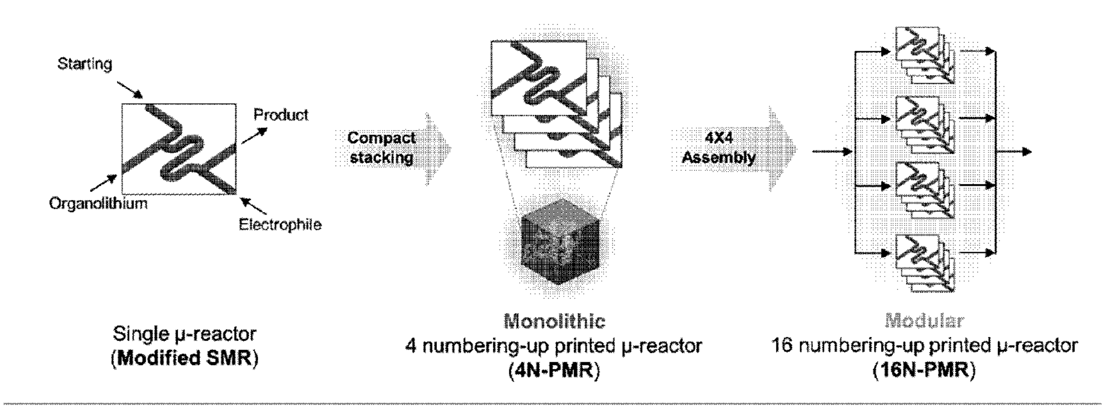
FIG. 19 shows the scale-up strategy of ultrafast subsecond flow synthesis using 4 numbering-up printed microfluidic reactors (4N-PMR) and 16N-PMR, which is an assembly thereof.
Figure 20:
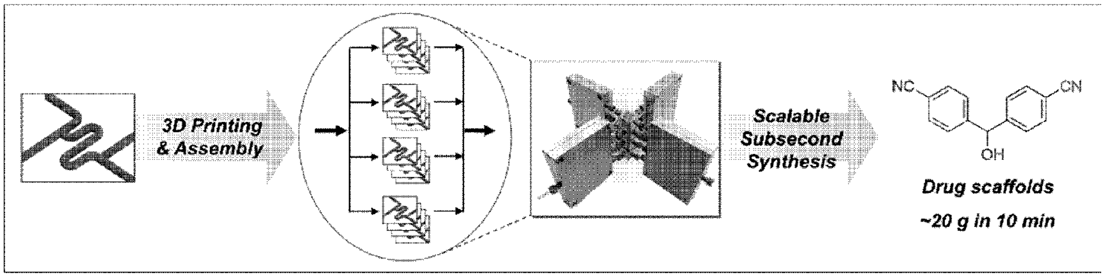
FIG. 20 shows the scale-up strategy of ultrafast subsecond flow synthesis using 4 numbering-up printed microfluidic reactors (4N-PMR) and 16N-PMR, which is an assembly thereof, and an example of drug scaffolds obtained by scalable subsecond synthesis.

For the verification of greater scalability, a numerical computational fluid dynamics (CFD) study on pressure drop were performed by designing a conceptual 128N-PMR system with 32 stacks of 4N-PMR modules as shown in FIG. 19. The 128N-PMR system was assembled with 32 sets of 4N-PMR modules in an integrated form and 4 EFDs with 32 outlets.

Figure 18:
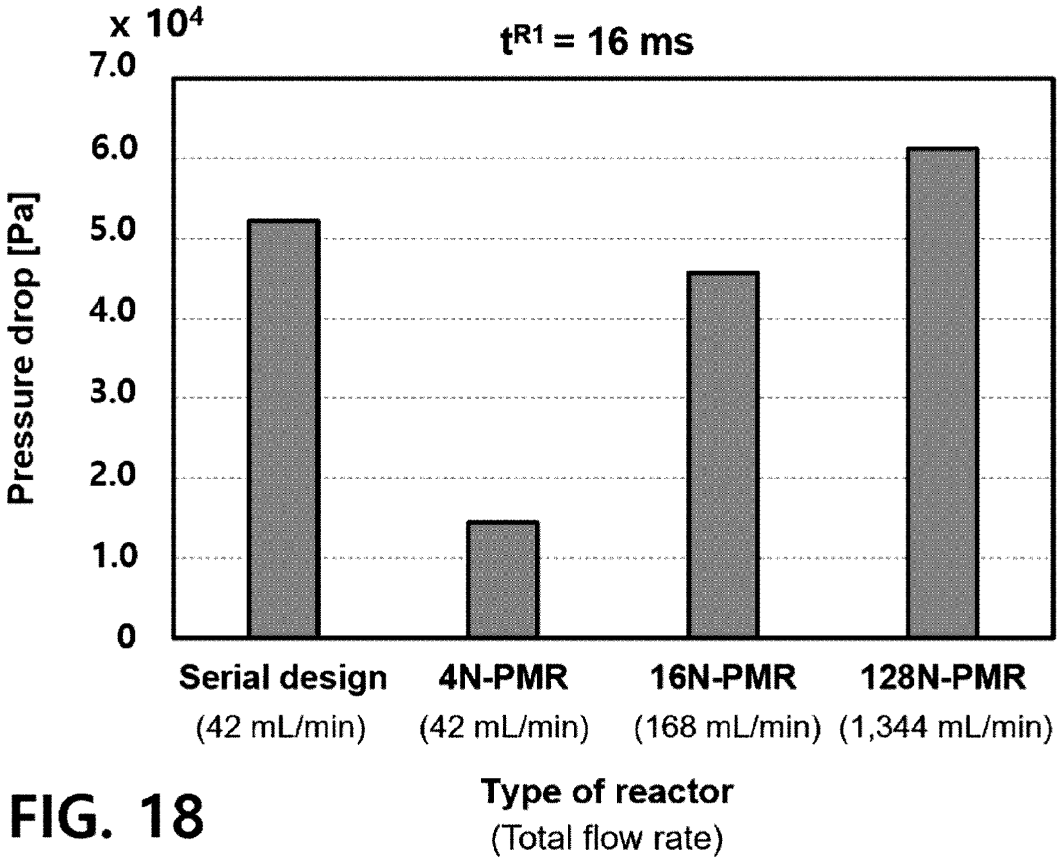
FIG. 18 shows the comparison of the pressure drop results obtained by the computational fluid dynamics (CFD) simulation for each of the series microfluidic reactor, 4N-PMR, 16N-PMR and 128N-PMR at different flow rates and residence times ($t^{R1}$) of 0.016 s.

As confirmed in FIG. 17, the pressure drop for the 128N-PMR at a residence time ($t^{R1}$) of 0.016 s was $6.12\times10^4$ Pa. The pressure drops obtained by CFD simulation for the series microfluidic reactor, the 4N-PMR, the 16N-PMR and the 128N-PMR at different flow rates and residence times ($t^{R1}$) of 0.016 s are shown in comparison with FIG. 18. As shown in FIG. 18, it can be seen that when the production amount was increased through parallelization, the pressure drop was not significantly increased. When the results of FIGS. 5A, 5B, 14 and 18 are considered collectively, it can be seen that the pressure drop according to the increase in the production amount (the increase in the flow rate) was hardly generated in the parallelization method compared to the series connection method, and through this, it can be seen that the 128N-PMR system also exhibited an acceptable level of low pressure drop.

[Explanation of Reference Numerals]

| | |
|---|---|
| 100: | Microfluidic reactor |
| 110: | Housing |
| 130: | Unit flow path module |
| 131, 132, 133, 134: | Unit flow paths |
| 150: | Branch flow path module |
| 151, 152, 153: | Branch flow paths |
| 170: | Collection flow path |
| 180: | Metal frame |
| 190: | Tube |
| 200: | Microfluidic reaction device |

The invention claimed is:

1. A microfluidic reaction device which is capable of controlling a chemical reaction, comprising:

a plurality of microfluidic reactors wherein each microfluidic reactor of the plurality of microfluidic reactors is capable of controlling the chemical reaction between a plurality of fluids, wherein each microfluidic reactor of the plurality of microfluidic reactors comprises a housing formed of a metal material and having a predetermined volume, a unit flow path module formed inside the housing and comprising a plurality of unit flow paths, each unit flow path having N inlets, where N is an integer of 2 or more, and a single outlet such that N fluids are respectively introduced and mixed and then discharged, a branch flow path module formed inside the housing and comprising N branch flow paths which are all connected to corresponding ones of the N inlets provided in each unit flow path of the plurality of unit flow paths to uniformly branch a fluid introduced into the housing into the plurality of unit flow paths, and a collection flow path formed inside the housing, connected to individual outlets provided in each unit flow path of the plurality of unit flow paths, and collecting a mixed fluid moved from individual outlets provided in each unit flow path of the plurality of unit flow paths and discharging the mixed fluid outside the housing;

N external distributors external to the housing and corresponding in number to the N branch flow paths, which are all connected to inlet ends of the N branch flow paths provided in each microfluidic reactor of the plurality of microfluidic reactors so as to uniformly branch with respect to the plurality of microfluidic reactors after receiving a fluid from the outside; and an external collector external to the housing and connected to all of outlet ends of the collection flow paths, each collection flow path being provided being provided in a respective one of the plurality of microfluidic reactors so as to collect the mixed fluid discharged from the plurality of microfluidic reactors, wherein the unit flow path module, the branch flow path module and the collection flow path are monolithically and integrally formed inside the housing in a process of stacking the housing through a 3D printing process.

2. The microfluidic reaction device of claim 1, wherein the unit flow path module comprises a first unit flow path, a second unit flow path, a third unit flow path and a fourth unit flow path, and wherein each N branch flow path of the N branch flow paths constituting the branch flow path module is formed in a four-pronged branching structure and the collection flow path is formed in a four-pronged branching structure.

3. The microfluidic reaction device of claim 1, wherein the housing is formed in a hexahedral shape including an upper surface, a lower surface and four side surfaces, wherein the plurality of unit flow paths is arranged in parallel along a height direction of the housing, wherein the branch flow path module comprises three branch flow paths, wherein each of the three branch flow paths is disposed adjacent to a respective one of three different side surfaces among the four side surfaces, and wherein the collection flow path is disposed adjacent to one remaining side surface of the four side surfaces excluding the three side surfaces.

4. The microfluidic reaction device of claim 1, wherein the plurality of unit flow paths are connected in parallel so as to maintain a same flow rate.

5. The microfluidic reaction device of claim 1, wherein the 3D printing process is performed by selective laser melting.

6. The microfluidic reaction device of claim 1, wherein the unit flow path comprises a first inlet, a second inlet, and a third inlet, and wherein two types of fluids introduced from the first inlet and the second inlet are mixed to generate a first mixed fluid, and then further mixed with a fluid introduced from the third inlet.

7. The microfluidic reaction device of claim 6, wherein each unit flow path of the plurality of unit flow paths is formed to have a circular vertical cross section as a whole, wherein the circular vertical cross section has a diameter of about 500 μm, and wherein after the first mixed fluid is mixed, a distance from a first mixing point where the first mixed fluid is generated to a second mixing point where the first mixed fluid is mixed with the fluid introduced from the third inlet is about 10 mm, and the moving time of the first mixed fluid from the first mixing point to the second mixing point is within 16 ms.

8. The microfluidic reaction device of claim 1, further comprising a metal frame formed of a metal material and formed to surround an outer surface of the housing, wherein the metal frame is provided with N+1 coupling holes such that N+1 tube fixing members are screwed to be in close contact with the outer surface of the housing.

9. The microfluidic reaction device of claim 8, comprising 4 microfluidic reactors so as to have 16 unit flow paths in total.

* * * * *